(12) United States Patent
Na et al.

(10) Patent No.: US 12,326,702 B2
(45) Date of Patent: Jun. 10, 2025

(54) ELECTRONIC DEVICE FOR PROVIDING OPERATION STATE INFORMATION OF HOUSEHOLD ELECTRICAL DEVICE AND METHOD OF OPERATING THE SAME

(71) Applicant: SAMSUNG ELECTRONICS CO., LTD., Suwon-si (KR)

(72) Inventors: Dukkyun Na, Suwon-si (KR); Taejun Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/811,030

(22) Filed: Jul. 6, 2022

(65) Prior Publication Data

US 2023/0009432 A1    Jan. 12, 2023

Related U.S. Application Data

(63) Continuation of application No. PCT/KR2022/006370, filed on May 3, 2022.

(30) Foreign Application Priority Data

Jul. 8, 2021  (KR) .......................... 10-2021-0089950

(51) Int. Cl.
   *G05B 15/02*  (2006.01)
   *G06F 3/16*   (2006.01)
(52) U.S. Cl.
   CPC ............... *G05B 15/02* (2013.01); *G06F 3/16* (2013.01); *G05B 2219/2613* (2013.01); *G05B 2219/2642* (2013.01)

(58) Field of Classification Search
   CPC ............ G05B 15/02; G05B 2219/2613; G05B 2219/2642; G06F 3/16
   See application file for complete search history.

(56) References Cited

U.S. PATENT DOCUMENTS

| 10,482,901 B1 | 11/2019 | Maurer et al. |
| 11,073,541 B2 | 7/2021 | Sim et al. |
| 2018/0158288 A1 | 6/2018 | Logan et al. |

(Continued)

FOREIGN PATENT DOCUMENTS

| EP | 3382698 A1 | 10/2018 |
| JP | 2019082835 A2 | 5/2019 |

(Continued)

OTHER PUBLICATIONS

Supplementary European Search Report dated Jun. 10, 2024, in connection with European Patent Application No. 22837803.0, 8 pages.

(Continued)

*Primary Examiner* — Michael W Choi

(57) ABSTRACT

Provided are an electronic device for providing operation state information of a household electrical device without network function and a method of operating the electronic device. Provided is an electronic device receiving a first sound signal output from a household electrical device through a microphone, detecting the first sound signal as a wake-up signal, identifying first operation state information corresponding to the first sound signal from memory, and outputting a notification message representing the first operation state information.

15 Claims, 16 Drawing Sheets

(56) References Cited

U.S. PATENT DOCUMENTS

| | | |
|---|---|---|
| 2019/0214009 A1 | 7/2019 | An et al. |
| 2020/0096253 A1 | 3/2020 | Han et al. |
| 2021/0126985 A1* | 4/2021 | Brush .................... H04L 67/60 |

FOREIGN PATENT DOCUMENTS

| | | |
|---|---|---|
| KR | 10-1186333 B1 | 9/2012 |
| KR | 10-2017-0107281 A | 9/2017 |
| KR | 10-2018-0080011 A | 7/2018 |
| KR | 20180110979 A | 10/2018 |
| KR | 20190026521 A | 3/2019 |
| KR | 20190084566 A | 7/2019 |
| KR | 10-2019-0090368 A | 8/2019 |
| KR | 2040910 B1 | 11/2019 |
| KR | 10-2021-0044509 A | 4/2021 |
| KR | 10-2021-0064859 A | 6/2021 |

OTHER PUBLICATIONS

International Search Report and Written Opinion of the International Searching Authority dated Aug. 10, 2022, in connection with International Application No. PCT/KR2022/006370, 20 pages.

* cited by examiner

ELECTRONIC DEVICE FOR PROVIDING OPERATION STATE INFORMATION OF HOUSEHOLD ELECTRICAL DEVICE AND METHOD OF OPERATING THE SAME

CROSS-REFERENCE TO RELATED APPLICATIONS

This application is a continuation of International Application No. PCT/KR2022/006370, filed May 3, 2022, which claims priority to Korean Patent Application No. 10-2021-0089950, filed Jul. 8, 2021, the disclosures of which are herein incorporated by reference in their entirety.

BACKGROUND

1. Field

The disclosure relates to an electronic device for providing information representing an operation state of a household electrical device, and a method of operating the electronic device. More specifically, the disclosure relates to an electronic device for identifying a sound signal output from a household electrical device having no network function and outputting, to a user, operation state information of the household electrical device based on a result of the identifying, and a method of operating the electronic device.

2. Description of Related Art

With the development of multimedia technology and network technology, various services are provided to users through electronic devices. Particularly, with the development of voice recognition technology, users can provide a voice input (for example, an utterance) to electronic devices and receive response messages according to the voice inputs through a service providing agent. Lately, with the development of internet of things (IoT) technology, information about operation states of household electrical devices in a home is provided in the form of notifications from the household electrical devices, or household electrical devices are controlled by voice inputs from users.

Household electrical devices are used for a long time after being purchased. Because old household electrical devices do not have a network function, such as Wi-Fi or Bluetooth, an electronic device (for example, an artificial intelligence (AI) speaker) having an IoT function cannot be connected to such old household electrical devices through a network. When a network connection between an electronic device and an old household electrical device cannot be established, the electronic device can neither notify an operation state of the household electrical device nor control the household electrical device, which deteriorates user convenience. It is difficult to install a network module in an old household electrical device. Also, although a network module is additionally installed, related software for applying the IoT function needs to be developed.

Accordingly, because it is difficult to use the IoT function in an old household electrical device, a user who wants to use the IoT function in an old household electrical device has no choice but to replace the old household electrical device with a new model having the IoT function, which is an additional cost.

SUMMARY

The disclosure relates to an electronic device for providing information about an operation state of a household electrical device without network function by using a sound signal output from the household electrical device, and a method of operating the electronic device.

An embodiment of the disclosure provides an electronic device for detecting a sound signal output from a household electrical device, and outputting operation state information corresponding to the detected sound signal. An embodiment of the disclosure provides an electronic device for transmitting operation state information corresponding to a sound signal output from a household electrical device to a user's mobile terminal such that the operation state information is output in the form of a notification message through the mobile terminal.

In order to solve the above-described technical problems, an embodiment of the disclosure provides an electronic device for identifying an operation state of a household electrical device and outputting operation state information. An electronic device according to an embodiment of the disclosure includes: a memory storing a plurality of sound signals output from at least one household electrical device as a wake-up signal, and storing a plurality of pieces of operation state information respectively representing a plurality of operation states of the at least one household electrical device, the plurality of operation states respectively related to the plurality of sound signals; and a processor, wherein the processor is configured to receive a first sound signal output from a first household electrical device from among the plurality of sound signals through a microphone, identify the first sound signal as a wake-up signal, identify first operation state information corresponding to the first sound signal based on the plurality of pieces of operation state information, and control an output interface to output a notification message representing the first operation state information.

According to an embodiment of the disclosure, the memory may further store at least one word uttered by a user as the wake-up signal, and the processor may be further configured to receive a voice input uttered by a user through the microphone, and detect the voice input as the wake-up signal by identifying the at least one word from the voice input.

According to an embodiment of the disclosure, after detecting the voice input as the wake-up signal, the processor may be further configured to control a communication interface to transmit a second sound signal received from the first household electrical device to a server, and receive second operation state information of the first household electrical device corresponding to the second sound signal from the server through the communication interface.

According to an embodiment of the disclosure, the processor may be further configured to calculate similarities between the first sound signal and the plurality of sound signals stored in the memory, determine a sound signal having a greatest similarity from among the plurality of sound signals, as a sound signal corresponding to the first sound signal, and identify the first operation state information corresponding to the determined sound signal from among the plurality of pieces of operation state information.

According to an embodiment of the disclosure, the processor may be further configured to control a communication interface to transmit the first operation state information to a mobile terminal of a user, the mobile terminal connected to the electronic device through a wireless communication network, and output a notification message representing the first operation state information through the mobile terminal.

According to an embodiment of the disclosure, the memory may further store a plurality of pieces of follow-up operation information that are recommended in connection with the plurality of pieces of operation state information, and the processor may be further configured to identify first follow-up operation information related to the first operation state information and output the first follow-up operation state information.

According to an embodiment of the disclosure, the processor may be further configured to receive a new sound signal output from a new household electrical device newly registered in a server and new operation state information corresponding to the new sound signal from the server through a communication interface, and store device identification information of the new household electrical device, the new sound signal, and the new operation state information in the memory.

According to an embodiment of the disclosure, the processor may be further configured to transmit a registration request including user account information and device identification information of a new household electrical device to a server through a communication interface, and the new household electrical device may be registered in the server by connecting the device identification information of the new household electrical device to the user account information.

According to an embodiment of the disclosure, the processor may be further configured to receive update data for updating a wake-up signal sensing module from the server through the communication interface to perform a wake-up operation by detecting a new sound signal output from the new household electrical device, and update the wake-up signal sensing module by using the update data.

In order to solve the above-described technical problems, another embodiment of the disclosure provides a method of operating an electronic device to identify operation state information from a sound signal output from a household electrical device. An operation method according to an embodiment of the disclosure includes: receiving a first sound signal output from a first household electrical device; identifying the first sound signal as a wake-up signal; identifying first operation state information corresponding to the first sound signal, based on a plurality of pieces of operation state information stored in a memory; and outputting a notification message representing the first operation state information, wherein the memory stores a plurality of sound signals output from at least one household electrical device as a wake-up signal, and stores a plurality of pieces of operation state information respectively representing a plurality of operation states of the at least one household electrical device, the plurality of operation states respectively related to the plurality of sound signals.

According to an embodiment of the disclosure, the memory may store at least one word uttered by a user as the wake-up signal, and the method may further include: receiving a voice input uttered by a user; and detecting the voice input as the wake-up signal by identifying the at least one word from the voice input.

According to an embodiment of the disclosure, the method may further include: after detecting the voice input as the wake-up signal, transmitting, to a server, a second sound signal received from the first household electrical device, and receiving second operation state information of the first household electrical device corresponding to the second sound signal from the server.

According to an embodiment of the disclosure, the method may further include calculating similarities between the first sound signal and the plurality of sound signals stored in the memory, wherein the identifying of the first operation state information may include: determining a sound signal having a greatest similarity from among the plurality of sound signals, as a sound signal corresponding to the first sound signal; and identifying the first operation state information corresponding to the determined sound signal from among the plurality of pieces of operation state information.

According to an embodiment of the disclosure, the method may further include: transmitting the first operation state information to a mobile terminal connected to the electronic device through a wireless communication network to output a notification message representing the first operation state information through the mobile terminal.

According to an embodiment of the disclosure, the memory may further store a plurality of pieces of follow-up operation information that are recommended in connection with the plurality of pieces of operation state information, and the method may further include: identifying first follow-up operation information related to the first operation state information from the memory, and outputting the first follow-up operation information.

According to an embodiment of the disclosure, the method may further include: transmitting a registration request including user account information and device identification information of a new household electrical device to a server, wherein the new household electrical device may be registered in the server by connecting the device identification information of the new household electrical device to the user account information.

According to an embodiment of the disclosure, the method may further include: receiving a new sound signal output from the new household electrical device and new operation state information corresponding to the new sound signal from the server; and storing the new sound signal of the new household electrical device and the new operation state information in the memory.

According to an embodiment of the disclosure, the method may further include: receiving update data for updating a wake-up signal sensing module from the server to perform a wake-up operation by detecting a new sound signal output from the new household electrical device; and updating the wake-up signal sensing module by using the update data.

To solve the above-described technical problem, another embodiment of the disclosure provides a computer-readable recording medium storing a program for executing the method on a computer.

In order to solve the above-described technical problems, another embodiment of the disclosure provides a server including: a communication interface configured to perform data communication with the electronic device or a mobile terminal through a wired or wireless communication network; a memory storing a plurality of sound signals output from at least one household electrical device and a plurality of pieces of operation state information respectively representing a plurality of operation states respectively related to the plurality of sound signals; and a processor, wherein the processor is configured to receive a voice input uttered by a user and a sound signal output by a household electrical device from the electronic device through the communication interface, separate the voice input from the sound signal, identify operation state information corresponding to the sound signal from the memory, and control the communication interface to transmit the identified operation state information to a mobile terminal of the user.

BRIEF DESCRIPTION OF THE DRAWINGS

The disclosure may be easily understood by a combination of the following detailed description and accompanying drawings. Further, reference numerals refer to structural elements.

DETAILED DESCRIPTION

Figure 1:
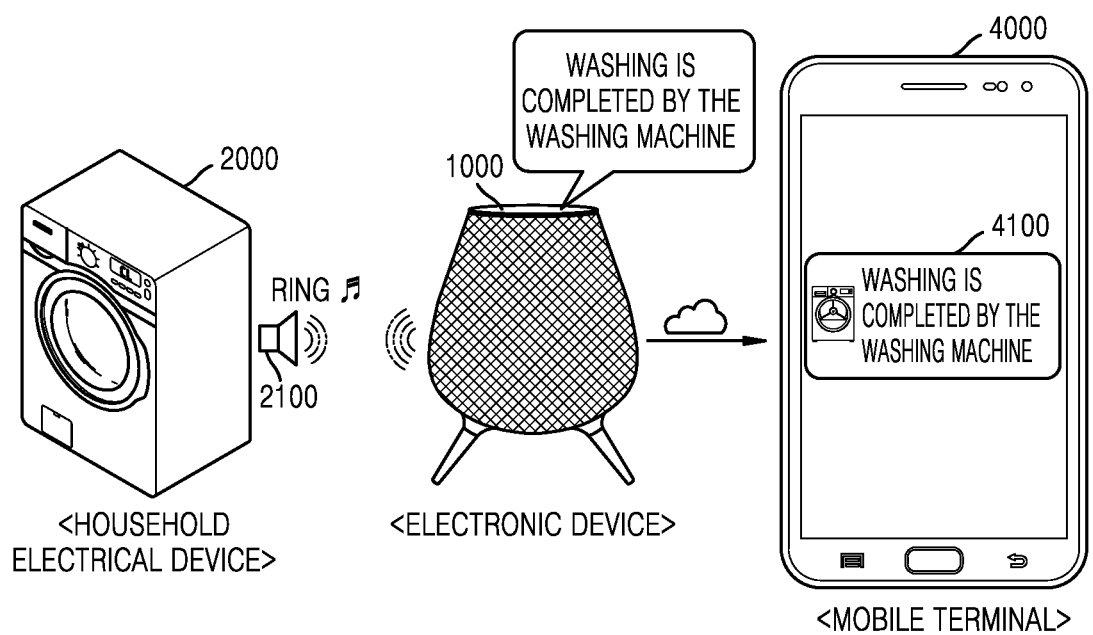
FIG. 1 illustrates an operation, by an electronic device, of outputting operation state information of a household electrical device based on a sound signal output from the household electrical device, according to an embodiment of the disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Although general terms being widely used in embodiments of the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise. Unless otherwise defined, all technical and scientific terms used herein have the same meaning as commonly understood by one of ordinary skill in the art to which the disclosure belongs.

It will be understood that when a certain part "includes" a certain component, the part does not exclude another component but can further include another component, unless the context clearly dictates otherwise. As used herein, the terms "unit" or "module" refers to a unit that can perform at least one function or operation, and may be implemented as hardware, software, or a combination of hardware and software.

The expressions "configured to" used in the disclosure may be replaced with, for example, "suitable for", "having the capacity to", "designed to", "adapted to", "made to", or "capable of" according to cases. The term "configured to" may not necessarily mean "specifically designed to". Instead, in some cases, the expression "system configured to" may mean that the system is "capable of . . . " together with another device or components. For example, the phrase "processor configured to perform A, B, or C" may be a dedicated processor (for example, an embedded processor) for performing the corresponding operation, or a generic-purpose processor (for example, a central processing unit (CPU) or an application processor) capable of performing the corresponding operations by executing one or more software programs stored in a memory.

In the disclosure, an 'electronic device' may be a device for detecting a sound signal output from a household electrical device as a wake-up signal, and outputting operation state information corresponding to the sound signal. The electronic device may include a network function, and be connected to a server or a mobile terminal through a wired or wireless communication network. According to an embodiment of the disclosure, the electronic device may be an artificial intelligence (AI) speaker that performs a voice recognition function. However, the electronic device is not limited to an AI speaker, and the electronic device may be, for example, a tablet personal computer (PC), a laptop PC, a workstation, a wearable device, a home camera, or mobile medical equipment.

In the disclosure, a 'household electrical device' may be an electronic device that is used in home. The household electrical device may include at least one of, for example, a television (TV), a refrigerator, an air cleaner, an air conditioner, an audio system, an induction, a washing machine, a clothes care apparatus, a dryer, a dish washer, an oven, a microwave, an air fryer, an automatic pet feeding machine, a water purifier, a light, or a bidet, but is not limited thereto. According to an embodiment of the disclosure, the household electrical device may output a sound signal representing an operation state. For example, the household electrical device may output a sound signal representing an error or a failure, as well as state information representing starting, finishing, or progressing of a certain function.

In the disclosure, a 'sound signal' may be a signal obtained by converting sound falling within an audible frequency range into an electrical waveform. According to an embodiment of the disclosure, the sound signal may have a format of a wave file, but is not limited thereto. According to an embodiment of the disclosure, a sound signal may be output from a household electrical device.

In the disclosure, a 'wake-up signal' may be a sound signal for activating an electronic device for switching to a voice recognition mode for performing a voice recognition function. When the electronic device operating in a standby mode or a sleep mode receives a wake-up signal, the electronic device may perform a wake-up operation for switching to a voice recognition mode for receiving a voice input from a user. According to an embodiment of the disclosure, the electronic device may wake up by sensing a wake-up signal through a wake-up signal sensing module. The wake-up signal may include a voice signal, such as, for example, 'Hi Bixby' or 'Hello Galaxy', etc. However, the disclosure is not limited thereto. For example, the wake-up signal may be a sound signal output from a household electrical device. In this case, the sound signal may have been registered in advance as a wake-up signal by a user.

Hereinafter, embodiments of the disclosure will be described in detail with reference to the accompanying drawings so that the disclosure may be readily implemented by one of ordinary skill in the technical field to which the disclosure pertains. However, the disclosure may be implemented in various different forms, and is not limited to the embodiments of the disclosure described herein.

Hereinafter, the embodiments of the disclosure will be described in detail with reference to the accompanying drawings.

FIG. 1 illustrates an operation, by an electronic device 1000, of outputting operation state information of a household electrical device 2000 based on a sound signal output from the household electrical device 2000, according to an embodiment of the disclosure.

Referring to FIG. 1, the electronic device 1000 may be a device for detecting a wake-up signal and performing an operation or function corresponding to the wake-up signal. According to an embodiment of the disclosure, the electronic device 1000 may be an AI speaker. However, the electronic device 1000 is not limited to an AI speaker, and may be various kinds of devices including a microphone. For example, the electronic device 1000 may be a tablet PC, a laptop PC, a workstation, a wearable device, a home camera, or mobile medical equipment.

The household electrical device 2000 may output a sound signal representing an operation state. According to an embodiment of the disclosure, the household electrical device 2000 may output a sound signal representing an error or a failure, as well as state information representing starting, finishing, or progressing of a function. The sound signal may be at least one of effect sound, bell sound, a melody, music, or a voice signal. According to an embodiment of the disclosure, as illustrated in FIG. 1, the household electrical device 2000 may be a washing machine, and include a speaker 2100 for outputting a sound signal representing washing completion.

The electronic device 1000 may receive a sound signal output from the speaker 2100 of the household electrical device 2000, and identify operation state information corresponding to the received sound signal. According to an embodiment of the disclosure, the electronic device 1000 may compare the sound signal received from the household electrical device 2000 with a pre-registered sound signal, and, when the received sound signal is identical to the pre-registered sound signal or similarity between the received sound signal and the pre-registered sound signal exceeds a preset threshold value according to a result of the comparing, the electronic device 1000 may wake up by detecting the sound signal received from the household electrical device 2000 as a wake-up signal. According to an embodiment of the disclosure, when the sound signal received from the household electrical device 2000 is not similar to the pre-registered sound signal, the electronic device 1000 may ignore the sound signal without performing any operation of responding to the sound signal.

The electronic device 1000 may compare the sound signal detected as the wake-up signal with a plurality of sound signals stored in advance in database, and identify a sound signal that is most similar to the sound signal received as the wake-up signal from among the plurality of sound signals stored in the database according to a result of the comparing. The electronic device 1000 may identify operation state information corresponding to the identified sound signal, and obtain the operation state information from the database. According to the embodiment of the disclosure, as illustrated in FIG. 1, the electronic device 1000 may obtain 'washing completion' information as the operation state information corresponding to the received sound signal.

The electronic device 1000 may output a notification message representing the operation state information. The electronic device 1000 may output a notification message in the form of a voice through a speaker 1500 (see FIGS. 2A and 3). According to an embodiment of the disclosure, the electronic device 1000 may output the notification message representing the operation state information, together with information representing a subject of the operation. According to the embodiment of the disclosure, as illustrated in FIG. 1, the electronic device 1000 may output a voice message "washing is completed by the washing machine" as the notification message representing the operation state information of 'washing completion'.

According to an embodiment of the disclosure, the electronic device 1000 may transmit the operation state information to a mobile terminal 4000. The mobile terminal 4000 may be at least one of a smart phone, a tablet PC, a digital camera, an e-book terminal, personal digital assistants (PDA), a portable multimedia player (PMP), or a MPEG audio layer-3 (MP3) player, but is not limited thereto. For example, the mobile terminal 4000 may be a wearable device. The wearable device may be a device worn by a user, and include at least one of an accessory type device (for example, a watch, a ring, a bracelet, an anklet, a necklace, glasses, and contact lenses), a head-mounted device (HMD), a device combined with fabrics or clothes (for example, electronic clothes), a body attaching type device (for example, a skin pad), or a bio-implantable type device (for example, an implantable circuit). According to the embodiment of the disclosure, the mobile terminal 4000 may be a smart phone.

The mobile terminal 4000 may receive the operation state information from the electronic device 1000, and output a notification message 4100 representing the received operation state information. According to an embodiment of the disclosure, the mobile terminal 4000 may display the notification message 4100 representing the operation state information of the household electrical device 2000 in a form of a pop-up message. According to another embodiment of the disclosure, the mobile terminal 4000 may output a notification message in a form of a voice representing the operation state information of the household electrical device 2000 through the speaker 2100.

A device such as an AI speaker having an IoT function may be not connected to an old household electrical device without network function. When an IoT device is not connected to an old household electrical device without network function, it may be impossible to provide a notification about an operation state of the household electrical device or control the household electrical device, which deteriorates user convenience. It may be difficult to additionally install a network module in an old household electrical device, and although a network module is additionally installed, related software may need to be additionally developed to apply the IoT function, resulting in a reduction of efficiency. For a device having an IoT function to provide a notification about an operation state of a household electrical device or control the household electrical device, there may be no choice but to replace an old household electrical device with a latest household electrical device. In this case, a lot of cost may be needed.

Because the electronic device 1000 according to an embodiment of the disclosure detects a sound signal output from the household electrical device 2000, identifies operation state information corresponding to the sound signal, and outputs a notification message representing the operation state information, the electronic device 1000 may provide an IoT function related to the household electrical device 2000 although the household electrical device 2000 without network function. Accordingly, the electronic device 1000 according to an embodiment of the disclosure may improve usage satisfaction and convenience. Also, because the electronic device 1000 according to an embodiment of the disclosure outputs a notification message representing operation state information of the existing household electrical device 2000, additionally purchasing a new IoT device may be not needed, which improves economical utility by removing cost burden and increases utilization of functions of the household electrical device 2000.

Figure 2A:
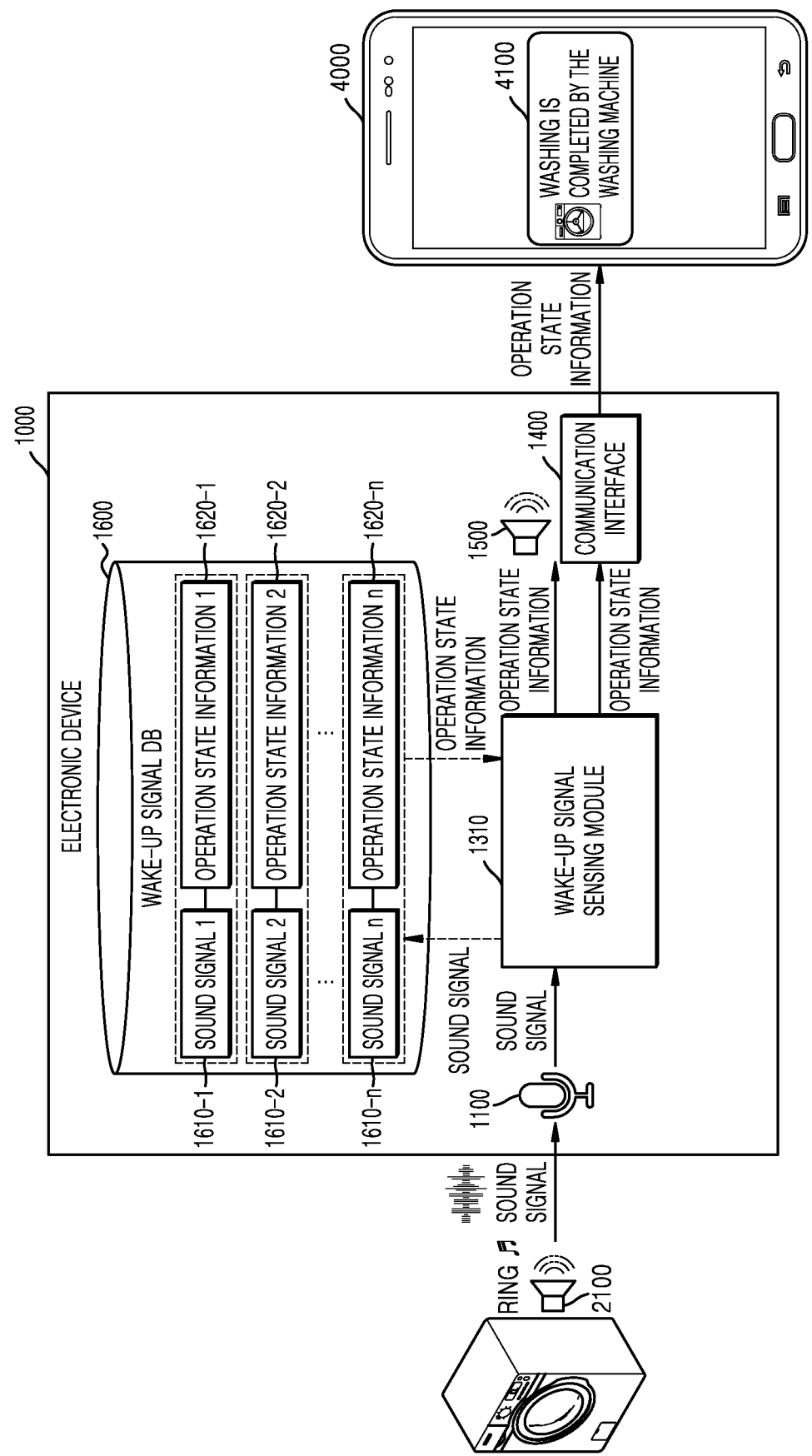
FIG. 2A illustrates an embodiment of an electronic device outputting operation state information of a household electrical device based on a sound signal output from the household electrical device and transmitting the operation state information to a mobile terminal, according to an embodiment of the disclosure.

FIG. 2A illustrates an embodiment of the electronic device 1000 outputting operation state information of the household electrical device 2000 based on a sound signal output from the household electrical device 2000 and transmitting the operation state information to the mobile terminal 4000, according to an embodiment of the disclosure.

FIG. 2A is a view for describing data transmission/reception and operation execution between components, and arrows illustrated in FIG. 2A represent transmission/reception directions of data.

Referring to FIG. 2A, the electronic device 1000 may include a microphone 1100, a wake-up signal sensing module 1310, a communication interface 1400, a speaker 1500, and a wake-up signal database 1600. In FIG. 2A, essential components for describing functions and/or operations of the electronic device 1000 are illustrated. However, components included in the electronic device 1000 are not limited to those illustrated in FIG. 2A. The components of the electronic device 1000 will be described in detail with reference to FIG. 3, below.

The electronic device 1000 may receive a sound signal output from the speaker 2100 of the household electrical device 2000 through the microphone 1100. A 'sound signal' received through the microphone 1100 may be at least one of effect sound, bell sound, a melody, music, or a voice signal. The microphone 1100 may perform a pre-processing operation of removing noise (for example, a non-acoustic component) from a sound signal output from the household electrical device 2000. The microphone 1100 may transmit the sound signal to the wake-up signal sensing module 1310.

The wake-up signal sensing module 1310 may be a module configured to detect a predefined sound signal among sound signals output from the household electrical device 2000, as a wake-up signal. The wake-up signal sensing module 1310 may compare the sound signal detected as the wake-up signal with a plurality of sound signals 1610-1 to 1610-$n$ stored in advance in the wake-up signal database 1600, and identify a sound signal corresponding to the sound signal received from the household electrical device 2000 from among the plurality of sound signals 1610-1 to 1610-$n$ according to a result of the comparing. The wake-up signal sensing module 1310 may extract operation state information mapped to the identified sound signal from among a plurality of pieces of operation state information 1620-1 to 1620-$n$ stored in advance in the wake-up signal database 1600.

The wake-up signal database 1600 may be database storing a sound signal obtained in advance before the sound signal is received from the household electrical device 2000, and operation state information of the household electrical device 2000, corresponding to the sound signal obtained in advance. The plurality of sound signals 1610-1 to 1610-$n$ and the plurality of pieces of operation state information 1620-1 to 1620-$n$ respectively related to the plurality of sound signals 1610-1 to 1610-$n$ may be stored in the wake-up signal database 1600. According to an embodiment of the disclosure, the plurality of sound signals 1610-1 to 1610-$n$ may be paired with the corresponding pieces of the plurality of pieces of operation state information 1620-1 to 1620-$n$ and then stored in the wake-up signal database 1600. According to an embodiment of the disclosure, the plurality of sound signals 1610-1 to 1610-$n$ and the plurality of pieces of operation state information 1620-1 to 1620-$n$ may be stored in key-value types in the wake-up signal database 1600. For example, the plurality of sound signals 1610-1 to 1610-$n$ may be stored as keys in the wake-up signal database 1600, and the corresponding pieces of the plurality of pieces of operation state information 1620-1 to **1620-*n* may be stored as values in the wake-up signal database 1600**.

The plurality of sound signals 1610-1 to **1610-*n* may have a format of a wave file, but is not limited thereto. However, the plurality of sound signals 1610-1 to 1610-*n* may be stored in a format of a binary data file encoded in a binary format in the wake-up signal database 1600**.

The plurality of pieces of operation state information 1620-1 to **1620-*n* may further include device information (for example, device identification information, a device type, etc.) of the household electrical device 2000, in addition to information about operation states of the household electrical device 2000. For example, first operation state information 1620-1 may be washing start information of a washing machine, and second operation state information 1620-2** may be washing completion information of a dish washer.

According to an embodiment of the disclosure, the plurality of pieces of operation state information 1620-1 to **1620-*n* may include information about errors or failures of the household electrical device 2000, in addition to information about operation states of the household electrical device 2000. For example, n-th operation state information 1620-*n*** may be information about a door failure of a washing machine.

According to an embodiment of the disclosure, the plurality of sound signals 1610-1 to **1610-*n* and the plurality of pieces of operation state information 1620-1 to 1620-*n* may be obtained by a user input received through a registration process, and stored in the wake-up signal database 1600, but is not limited thereto. According to another embodiment of the disclosure, the plurality of sound signals 1610-1 to 1610-*n* and the plurality of pieces of operation state information 1620-1 to 1620-*n*** may be obtained from a server.

The wake-up signal sensing module 1310 may measure similarities between the sound signal received through the microphone 1100 and the plurality of sound signals 1610-1 to **1610-*n* stored in advance in the wake-up signal database 1600. According to an embodiment of the disclosure, the wake-up signal sensing module 1310 may perform pre-processing, such as frequency sampling, offset processing, etc., on the received sound signal, and convert the pre-processed sound signal into an acoustic feature vector by using at least one of mel-frequency cepstrum (MFCCs), filter-bank (FBANK), or feature space maximum likelihood linear regression (fMLLR). The wake-up signal sensing module 1310 may classify the acoustic feature vector into a predefined sound signal by using a classifier, and measure similarities to the plurality of sound signals 1610-1 to 1610-*n* based on a probability value representing a result of the classifying. The wake-up signal sensing module 1310** may measure similarities between sound signals by using an open source algorithm such as, for example, kaldi.

However, a method of measuring similarities between a received sound signal and the plurality of sound signals 1610-1 to **1610-*n* in the wake-up signal sensing module 1310 is not limited to the above-described method. For example, the wake-up signal sensing module 1310** may use an algorithm for calculating a cross-correlation between wavelengths of frequencies of sound signals, cosine similarity, or a known method of measuring similarities between sound signals.

The wake-up signal sensing module 1310 may identify a sound signal having a greatest similarity from among the plurality of sound signals 1610-1 to **1610-*n* stored in the wake-up signal database 1600**.

The wake-up signal sensing module 1310 may identify operation state information mapped to correspond to the identified sound signal from among the plurality of pieces of operation state information 1620-1 to **1620-*n* stored in the wake-up signal database 1600. For example, when the sound signal having the greatest similarity is a first sound signal 1610-1 among the plurality of sound signals 1610-1 to 1610-*n*, the wake-up signal sensing module 1310 may identify first operation state information 1620-1 mapped in a key-value type to the first sound signal 1610-1**.

The wake-up signal sensing module 1310 may extract the identified operation state information, and provide the operation state information to the speaker 1500 or transfer the operation state information to the communication interface 1400.

The speaker 1500 may output a notification message representing the operation state information provided from the wake-up signal sensing module 1310. According to an embodiment of the disclosure, the speaker 1500 may output a voice message representing the operation state information, but is not limited thereto. However, the speaker 1500 may output notification sound including at least one of effect sound, bell sound, melody, music, or a song, set in advance according to the operation state information.

The communication interface 1400 may transmit the operation state information to the mobile terminal 4000 of the user through a wired or wireless communication network. The communication interface 1400 may transmit the operation state information to the mobile terminal 4000 by using at least one data communication network of, for example, wired local area network (LAN), wireless LAN, wireless-fidelity (Wi-Fi), Bluetooth, zigbee, Wi-Fi Direct (WFD), Bluetooth Low Energy (BLE), wireless broadband internet (Wibro), world interoperability for microwave access (WiMAX), shared wireless access protocol (SWAP), wireless gigabit alliance (WiGig), or radio frequency (RF) communication.

The mobile terminal 4000 may display the notification message 4100 representing the operation state information received from the communication interface 1400 of the electronic device 1000. According to an embodiment of the disclosure, the mobile terminal 4000 may display the notification message 4100 in a form of a pop-up message, but is not limited thereto. However, the mobile terminal 4000 may output a voice notification message representing the operation state information through the speaker 1500.

The mobile terminal 4000 may be a device registered in advance in the server with the same user account as that of a user of the electronic device 1000.

Figure 2B:
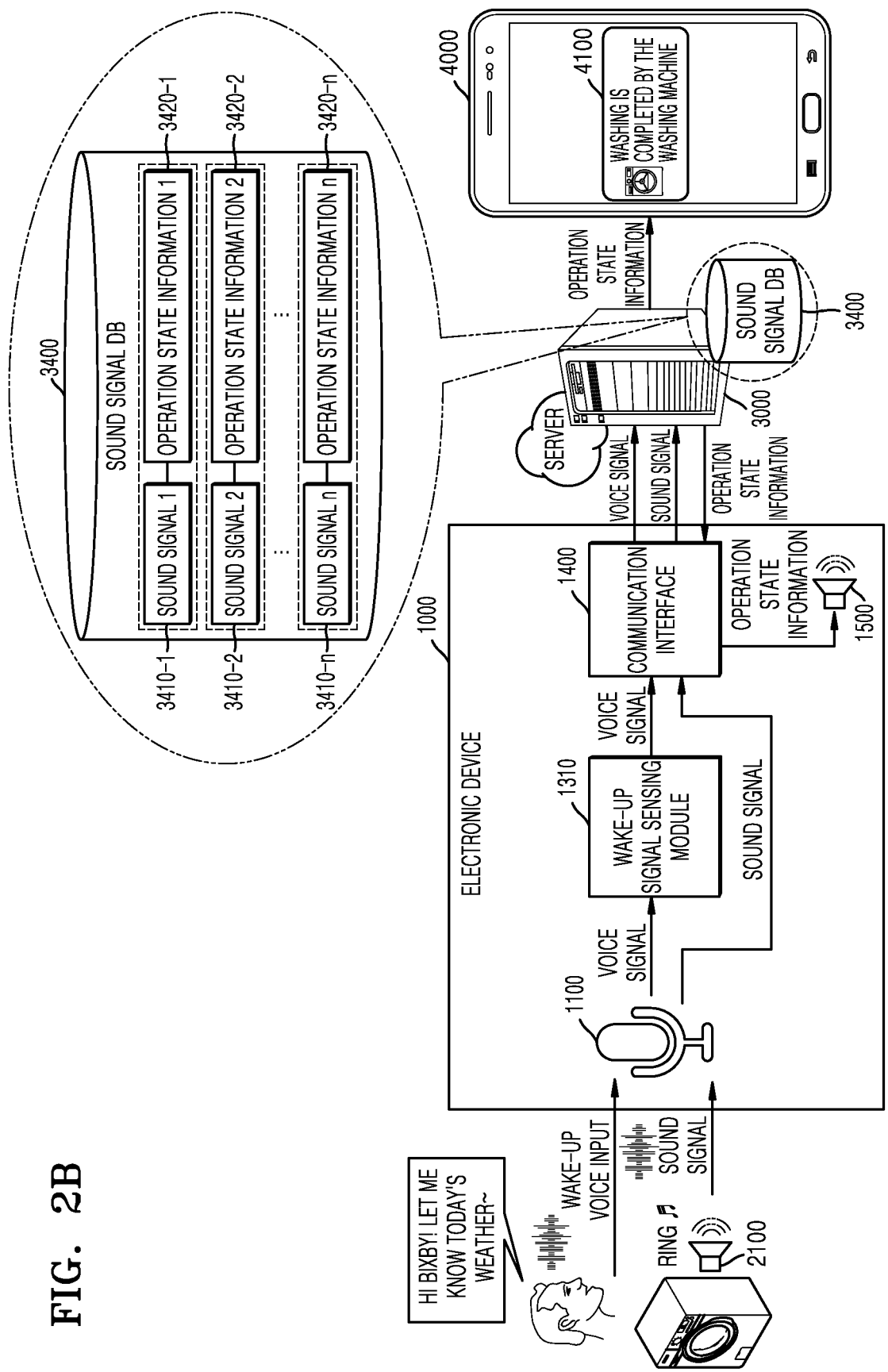
FIG. 2B illustrates an embodiment of an electronic device outputting operation state information of a household electrical device based on a sound signal output from the household electrical device and outputting a notification message through a mobile terminal, according to an embodiment of the disclosure.

FIG. 2B illustrates an embodiment of the electronic device 1000 outputting operation state information of the household electrical device 2000 based on a sound signal output from the household electrical device 2000 and outputting a notification message through the mobile terminal 4000, according to an embodiment of the disclosure.

Referring to FIG. 2B, the electronic device 1000 may include the microphone 1100, the wake-up signal sensing module 1310, the communication interface 1400, and the speaker 1500. In FIG. 2B, essential components for describing functions and/or operations of the electronic device 1000 are illustrated. However, components included in the electronic device 1000 are not limited to those illustrated in FIG. 2B. For example, the electronic device 1000 may further include the wake-up signal database 1600 (see FIG. 2A). FIG. 2B is a view for describing data transmission/reception and operation execution between components, and arrows illustrated in FIG. 2B represent transmission/reception directions of data.

The electronic device 1000 may receive a voice input from a user through the microphone 1100. The 'voice input' may be a voice uttered by the user. The voice input may include a wake-up voice. The 'wake-up voice' may be a voice instruction which is received by the wake-up signal sensing module 1310 and wakes the electronic device 1000 up to perform a voice recognition function. The 'wake-up voice' may include, for example, 'Hi Bixby' or 'Hello Galaxy', etc. In the embodiment illustrated in FIG. 2B, the microphone 1100 may receive a user's voice input "Hi Bixby! Let me know today's weather".

According to an embodiment of the disclosure, the microphone 1100 may obtain a voice signal by converting the received voice input into a sound signal and removing noise (for example, a non-acoustic component) from the sound signal. The microphone 1100 may transmit the voice signal to the wake-up signal sensing module 1310.

The wake-up signal sensing module 1310 may detect a wake-up signal (for example, a signal corresponding to Hi Bixby) included in the voice signal obtained from the microphone 1100. As the wake-up signal sensing module 1310 detects the wake-up signal, the wake-up signal sensing module 1310 may switch a standby mode of the electronic device 1000 to a voice recognition mode for activating the voice recognition function. After the electronic device 1000 is switched to the voice recognition mode, the wake-up signal sensing module 1310 may provide the voice signal to the communication interface 1400.

The communication interface 1400 may transmit the voice signal obtained from the wake-up signal sensing module 1310 to a server 3000. Functions and/or operations of the communication interface 1400 have been described above with reference to FIG. 2A, and therefore, redundant descriptions will be omitted.

After the microphone 1100 receives the voice input from the user, the microphone 1100 may receive a sound signal output from the household electrical device 2000.

After the wake-up signal sensing module 1310 detects the wake-up signal included in the voice input received from the user and provides the voice signal to the communication interface 1400, the wake-up signal sensing module 1310 may terminate operation. After the operation of the wake-up signal sensing module 1310 terminates, the sound signal of the household electrical device 2000, received through the microphone 1100, may be transferred to the communication interface 1400. The communication interface 1400 may transmit the sound signal to the server 3000.

The server 3000 may include sound signal database 3400. Components included in the server 3000 are not limited to those illustrated in FIG. 2B. The components of the server 3000 will be described in detail with reference to FIG. 14.

The sound signal database 3400 may be database storing a plurality of sound signals 3410-1 to 3410-n related to household electrical devices and a plurality of pieces of operation state information 3420-1 to 3420-n of the household electrical devices respectively related to the plurality of sound signals 3410-1 to 3410-n. According to an embodiment of the disclosure, the plurality of sound signals 3410-1 to 3410-n and the plurality of pieces of operation state information 3420-1 to 3420-n may be stored in key-value types in the sound signal database 3400.

The server 3000 may measure similarities between the sound signal received from the electronic device 1000 and the plurality of sound signals 3410-1 to 3410-n stored in advance in the sound signal database 3400, and identify a sound signal having a greatest similarity from among the plurality of sound signals 3410-1 to 3410-n. A method of measuring similarities between sound signals in the server 3000 may be the same as that performed by the wake-up signal sensing module 1310 as described above with reference to FIG. 2A, and therefore, redundant descriptions will be omitted. The server 3000 may identify operation state information mapped to correspond to the identified sound signal. For example, when the sound signal having a greatest similarity to the sound signal received from the electronic device 1000 among the plurality of sound signals 3410-1 to 3410-n is a second sound signal 3410-2, the server 3000 may identify second operation state information 3420-2 mapped to the second sound signal 3410-2 in a key-value type. The server 3000 may extract the identified operation state information and transmit the operation state information to the electronic device 1000.

The electronic device 1000 may receive the operation state information from the server 3000 through the communication interface 1400. The communication interface 1400 may provide the operation state information to the speaker 1500, and the speaker 1500 may output a notification message representing the operation state information.

The server 3000 may transmit the operation state information to the mobile terminal 4000. The mobile terminal 4000 may display a notification message 4100 representing the operation state information, received from the server 3000. According to an embodiment of the disclosure, the mobile terminal 4000 may display the notification message 4100 in a form of a pop-up message.

Although not illustrated in FIG. 2B, the server 3000 may generate a response message with respect to a voice signal (that is, a user's utterance) received from the communication interface 1400 of the electronic device 1000. According to an embodiment of the disclosure, the server 3000 may convert the received voice signal into computer-readable text by using an automatic speech recognition (ASR) model, detect a domain, an intent, and a parameter included in the text by using a natural language understanding (NLU) model, and generate a response message corresponding to the domain, the intent, and the parameter by using a natural language generation (NLG) model. The server 3000 may transmit the response message to the electronic device 1000. The electronic device 1000 may receive the response message through the communication interface 1400, and output the received response message through the speaker 1500.

In the embodiment illustrated in FIG. 2A, the electronic device 1000 may detect a sound signal output from the household electrical device 2000 through the wake-up signal sensing module 1310, as a wake-up signal, obtain operation state information corresponding to the sound signal, and output the operation state information. Because the embodiment illustrated in FIG. 2A is an embodiment in which the electronic device 1000 operates in an on-device state without any intervention of the server 3000 (see FIG. 2B), network cost may be not added, and high processing speed may be achieved. Also, because the electronic device 1000 operates according to a sound signal from the household electrical device 2000 stored in advance in the wake-up signal database 1600 through a registration procedure, user convenience may be improved.

The embodiment illustrated in FIG. 2B may correspond to a case in which a voice input uttered by a user, in addition to a sound signal from the household electrical device 2000, is received, unlike the embodiment illustrated in FIG. 2A. According to the embodiment of FIG. 2B, the electronic device 1000 may perform a wake-up operation for switching from the standby mode (or a sleep mode) to the voice recognition mode by a wake-up signal included in a voice input received from a user, and, after the electronic device 1000 wakes up, the electronic device 1000 may transmit all received voice signals and sound signals to the server 3000. A sound signal output from the household electrical device 2000 may be transmitted to the server 3000, and the server 3000 may transmit operation state information corresponding to the sound signal to the electronic device 1000. In the embodiment illustrated in FIG. 2B, because the electronic device 1000 uses a communication network, network cost may be generated. The server 3000 may store a relatively larger amount of sound signals and related operation state information, than an on-device. Accordingly, in the embodiment illustrated in FIG. 2B, sound signals that may be not identified in the embodiment of FIG. 2A may be identified, and the corresponding operation state information may be provided. Accordingly, recognition accuracy of a sound signal output from the household electrical device 2000 may be improved.

Figure 3:
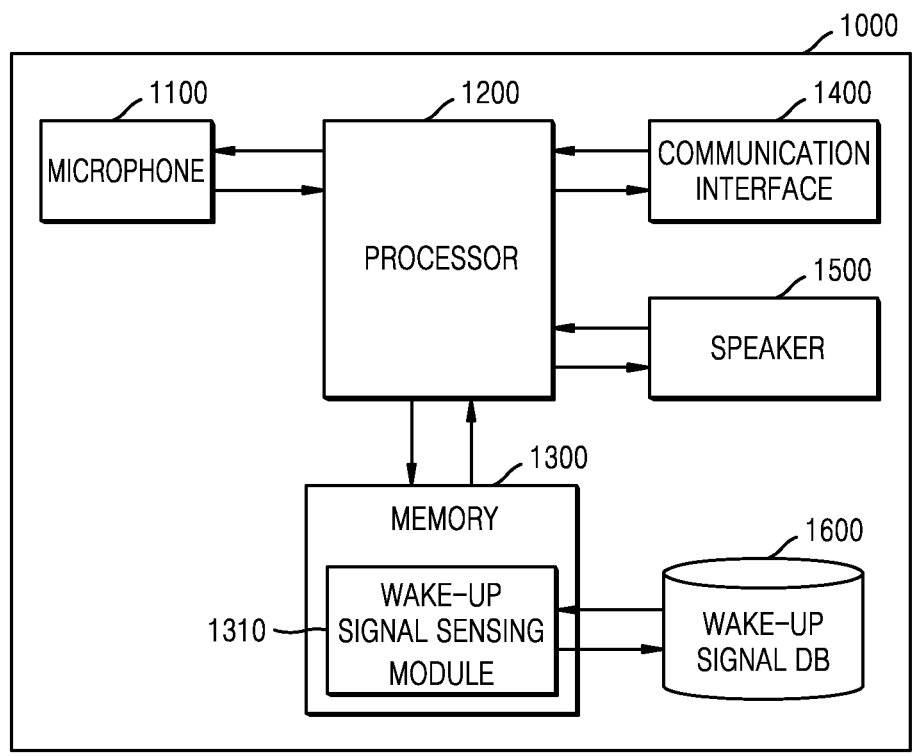
FIG. 3 illustrates a block diagram of an electronic device according to an embodiment of the disclosure.

FIG. 3 illustrates a block diagram of the electronic device 1000 according to an embodiment of the disclosure.

The electronic device 1000 may be a device for detecting a wake-up signal and performing an operation or function corresponding to the wake-up signal. According to an embodiment of the disclosure, the electronic device 1000 may be an AI speaker, but is not limited thereto. The electronic device 1000 may be a tablet PC, a laptop PC, a workstation, a wearable device, a home camera, or mobile medical equipment.

Referring to FIG. 3, the electronic device 1000 may include the microphone 1100, a processor 1200, a memory 1300, the communication interface 1400, the speaker 1500, and the wake-up signal database 1600. The microphone 1100, the processor 1200, the memory 1300, the communication interface 1400, the speaker 1500, and the wake-up signal database 1600 may be electrically and/or physically connected to each other.

The microphone 1100 may receive a sound signal or a voice signal. According to an embodiment of the disclosure, the microphone 1100 may receive a sound signal output from the household electrical device 2000 (see FIGS. 1, 2A, and 2B). The 'sound signal' may be at least one of effect sound, bell sound, a melody, music, or a voice signal.

According to an embodiment of the disclosure, the microphone 1100 may receive a voice input uttered by a user. The microphone 1100 may obtain a voice signal by converting the received voice input into a sound signal and removing noise (for example, a non-acoustic component) from the sound signal.

The microphone 1100 may provide the sound signal or the voice signal to the processor 1200.

The processor 1200 may execute one or more instructions of a program stored in the memory 1300. The processor 1200 may be configured as a hardware component for performing arithmetic, logic, and input/output operations and signal processing. The processor 1200 may be configured as at least one of, for example, a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), but is not limited thereto.

In FIG. 3, the processor 1200 is illustrated to be a single element. However, the processor 1200 is not limited to this. According to an embodiment of the disclosure, the processor 1200 may be configured as one or plurality of processors.

According to an embodiment of the disclosure, the processor 1200 may be configured as a dedicated hardware chip that performs AI training.

The memory 1300 may store a program including instructions for outputting operation state information corresponding to the sound signal output from the household electrical device 2000, based on the sound signal. The memory 1300 may store instructions and program codes that are readable by the processor 1200. In the following embodiments, the processor 1200 may be implemented by executing the instructions or program codes stored in the memory 1300.

The memory 1300 may be configured as at least one type of storage medium of, for example, a flash memory type, a hard disk type, a multimedia card micro type, a card type memory (for example, Secure Digital (SD) or eXtreme Digital (XD) memory), random access memory (RAM), static random access memory (SRAM), read-only memory (ROM), electrically erasable programmable read-only memory (EEPROM), programmable read-only memory (PROM), or an optical disk.

The memory 1300 may store data about the wake-up signal sensing module 1310. A 'module' included in the memory 1300 means a unit for processing a function or operation that is performed by the processor 1200, and may be implemented as software, such as instructions or program codes.

In the following embodiments, the processor 1200 may be implemented by executing the instructions or program codes stored in the memory 1300.

The wake-up signal sensing module 1310 may be a module configured to detect a wake-up signal from a sound signal or a voice signal. As a wake-up signal is detected by the wake-up signal sensing module 1310, the electronic device 1000 may perform a wake-up operation for switching from the standby mode (or sleep mode) to the voice recognition mode.

According to an embodiment of the disclosure, the wake-up signal sensing module 1310 may compare the sound signal detected as the wake-up signal with a plurality of sound signals stored in advance in the wake-up signal database 1600, and identify a sound signal corresponding to the received sound signal from among the plurality of sound signals, according to a result of the comparing.

The processor 1200 may receive a sound signal or a voice signal through the microphone 1100. When a sound signal output from the household electrical device 2000 is received through the microphone 1100, the processor 1200 may compare the received sound signal with a plurality of sound signals stored in advance in the wake-up signal database 1600 and identify a sound signal corresponding to the received sound signal from among the plurality of sound signals by executing instructions or program codes of the wake-up signal sensing module 1310.

According to an embodiment of the disclosure, the processor 1200 may measure similarities between the sound signal received through the microphone 1100 and the plurality of sound signals stored in the wake-up signal database 1600, and identify a sound signal corresponding to the sound signal received through the microphone 1100 from among the plurality of sound signals based on the similarities. According to an embodiment of the disclosure, the processor 1200 may perform pre-processing, such as frequency sampling, offset processing, etc., on the received sound signal, and convert the pre-processed sound signal into an acoustic feature vector. The processor 1200 may convert the sound signal into the acoustic feature vector by using at least one of, for example, mel-frequency cepstrum (MFCCs), filter-bank (FBANK), or feature space maximum likelihood linear regression (fMLLR). The processor 1200 may calculate probability values with which the acoustic feature vector is classified into the plurality of sound signals stored in advance in the wake-up signal database 1600, by using a classifier. The classifier may be at least one of, for example, logistic regression, support vector machine (SVM), decision tree, or random forest. The processor 1200 may measure similarities between sound signals by using an open source algorithm such as kaldi.

The processor 1200 may extract at least one sound signal of which a calculated probability value exceeds a preset threshold value, and identify a sound signal having a greatest probability value among the extracted at least one sound signal.

However, a method of measuring similarities between a sound signal received through the microphone 1100 and a plurality of sound signals stored in the wake-up signal database 1600 in the processor 1200 is not limited to the above-described method. According to another embodiment of the disclosure, the processor 1200 may measure similarities between sound signals by using an algorithm for calculating a cross-correlation between wavelengths of frequencies of sound signals, cosine similarity, or a known method of measuring similarities between sound signals.

The processor 1200 may identify operation state information corresponding to the sound signal identified from the wake-up signal database 1600. The wake-up signal database 1600 may store a plurality of sound signals and a plurality of pieces of operation state information for the respective sound signals. The wake-up signal database 1600 may store the plurality of pieces of operation state information respectively corresponding to the plurality of sound signals. According to an embodiment of the disclosure, the plurality of sound signals and the plurality of pieces of operation state information may be stored in key-value types in the wake-up signal database 1600. For example, the plurality of sound signals may be stored as keys in the wake-up signal database 1600, and the corresponding pieces of the plurality of pieces of operation state information may be stored as values in the wake-up signal database 1600. The processor 1200 may identify operation state information mapped to the identified sound signal in a key-value type from the wake-up signal database 1600. An embodiment of identifying operation state information from the wake-up signal database 1600 based on similarities between sound signals in the processor 1200 will be described in detail with reference to FIG. 8, below.

According to an embodiment of the disclosure, the processor 1200 may extract the identified operation state information from the wake-up signal database 1600 and provide the extracted operation state information to the communication interface 1400. The communication interface 1400 may transmit the operation state information to the mobile terminal 4000 such that the operation state information is output in a form of a notification message on the mobile terminal 4000.

According to another embodiment of the disclosure, the processor 1200 may provide the operation state information to the speaker 1500.

The processor 1200 may provide follow-up operation information related to the operation state information to the communication interface 1400 or the speaker 1500. According to an embodiment of the disclosure, the wake-up signal database 1600 may further store information about a follow-up operation that may be recommended as an operation following each of the plurality of pieces of operation state information, in addition to the plurality of sound signals and the plurality of pieces of operation state information. In the wake-up signal database 1600, the plurality of sound signals, the plurality of pieces of operation state information, and a plurality of pieces of follow-up operation information may be paired with each other and stored. According to an embodiment of the disclosure, the processor 1200 may extract follow-up operation information corresponding to the identified operation state information from among the plurality of pieces of follow-up operation information stored in the wake-up signal database 1600, and transmit the extracted follow-up operation information to the mobile terminal 4000 of the user through the communication interface 1400 or output the follow-up operation information in a form of a voice message through the speaker 1500. An embodiment of providing follow-up operation information in the processor 1200 will be described in detail with reference to FIGS. 9 to 12.

According to an embodiment of the disclosure, the electronic device 1000 may register a new household electrical device in the server 3000. The processor 1200 may register the new household electrical device by transmitting device identification information of the new household electrical device to the server 3000, through an application. The new household electrical device may be registered in the server 3000 with the same account as that of a user logged in the electronic device 1000. Device identification information and a sound signal of the new household electrical device may have not been stored in the wake-up signal database 1600. In this case, the processor 1200 may transmit, to the server 3000, a signal requesting the server 3000 to provide device information of the new household electrical device and a sound signal of the new household electrical device. According to an embodiment of the disclosure, the processor 1200 may request the server 3000 to provide update data for updating the wake-up signal sensing module 1310 through the communication interface 1400, and receive the update data for updating the wake-up signal sensing module 1310 from the server 3000. The update data may include, for example, device identification information of the new household electrical device, a new sound signal that is output by the new household electrical device, and new operation state information corresponding to the new sound signal. The processor 1200 may update the wake-up signal sensing module 1310 by using the update data received from the server 300. An embodiment of updating the wake-up signal sensing module 1310 by using update data received from the server 3000 in the processor 1200 will be described in detail with reference to FIG. 13, below.

However, the disclosure is not limited to the embodiment, and the processor 1200 may receive a new sound signal output from the new household electrical device by using the microphone 1100, and store the received new sound signal in the wake-up signal database 1600. In this case, the processor 1200 may store the new sound signal output from the new household electrical device, together with device identification information of the new household electrical device, in the wake-up signal database 1600.

When a voice input including a wake-up signal uttered by a user, for example, a voice, such as 'Hi Bixby' or 'Hello Galaxy', is received through the microphone 1100, the processor 1200 may detect Hi Bixby included in the voice input as a wake-up signal by using instructions or program codes related to the wake-up signal sensing module 1310. After the wake-up signal is detected, the processor 1200 may wake up, and after the processor 1200 wakes up, a sound signal of the household electrical device 2000, received through the microphone 1100, may be transmitted to the server 3000 (see FIG. 2B) through the communication interface 1400 without being detected or processed by the processor 1200.

The processor 1200 may receive operation state information corresponding to a sound signal from the server 3000 through the communication interface 1400. For example, the server 3000 may compare a sound signal received from the electronic device 1000 with the plurality of sound signals 3410-1 to 3410-$n$ stored in the sound signal database 3400 (see FIG. 2B), and identify a sound signal corresponding to the received sound signal. The server 3000 may search operation state information corresponding to the identified sound signal in the sound signal database 3400. The server 3000 may transmit the searched operation state information to the electronic device 1000.

The communication interface 1400 may be configured to perform data transmission/reception to/from the server 3000 or the mobile terminal 4000 through a wired or wireless communication network. The communication interface 1400 may perform data communication with the server 3000 or the mobile terminal 4000 by using at least one data communication network of, for example, a wired LAN, a wireless LAN, Wi-Fi, Bluetooth, zigbee, Wi-Fi Direct (WFD), Bluetooth Low Energy (BLE), wireless broadband internet (Wibro), world interoperability for microwave access (WiMAX), shared wireless access protocol (SWAP), wireless gigabit alliance (WiGig), or RF communication.

The communication interface 1400 may transmit the operation state information to the server 3000 or the mobile terminal 4000 through a control by the processor 1200. According to an embodiment of the disclosure, the communication interface 1400 may transmit a sound signal or a voice signal to the server 3000 through a control by the processor 1200.

The speaker 1500 may output an audio signal. The speaker 1500 may output a notification message representing the operation state information through a control by the processor 1200. According to an embodiment of the disclosure, the speaker 1500 may output a voice message representing the operation state information, but is not limited thereto. However, the speaker 1500 may output notification sound including at least one of effect sound, bell sound, a melody, music, or a song, set in advance according to the operation state information.

Although not illustrated in FIG. 3, the electronic device 1000 may further include a display. According to an embodiment of the disclosure, the display may display the notification message in a form of text or a graphic user interface (GUI) through a control by the processor 1200. The display may be configured as at least one of, for example, a liquid crystal display (LCD), a thin film transistor-liquid crystal display (TFT-LCD), an organic light-emitting diode (OLED) display, a flexible display, a three Dimensional (3D) display, or an electrophoretic display.

The wake-up signal database 1600 may be a storage medium storing a plurality of sound signals and a plurality of pieces of operation state information related to the plurality of sound signals. The wake-up signal database 1600 may be configured as a non-volatile memory. The non-volatile memory may be a storage medium capable of storing and maintaining information even when no supply voltage is supplied and using the stored information when a supply voltage is supplied. The non-volatile memory may include at least one of, for example, a flash memory, a hard disk, a solid state drive (SSD), a multimedia card micro type, a card type memory (for example, SD or XD memory), ROM, a magnetic disk, or an optical disk. In FIG. 3, the wake-up signal database 1600 is illustrated to be a separate component from the memory 1300, but is not limited thereto. According to an embodiment of the disclosure, the wake-up signal database 1600 may be a single component included in or integrated into the memory 1300, but is not limited thereto. However, the wake-up signal database 1600 may be implemented in a form of an external memory not included in the electronic device 1000, or as a web-based storage medium connected to the electronic device 1000 via the communication interface 1400 through wired/wireless communication.

Figure 4:
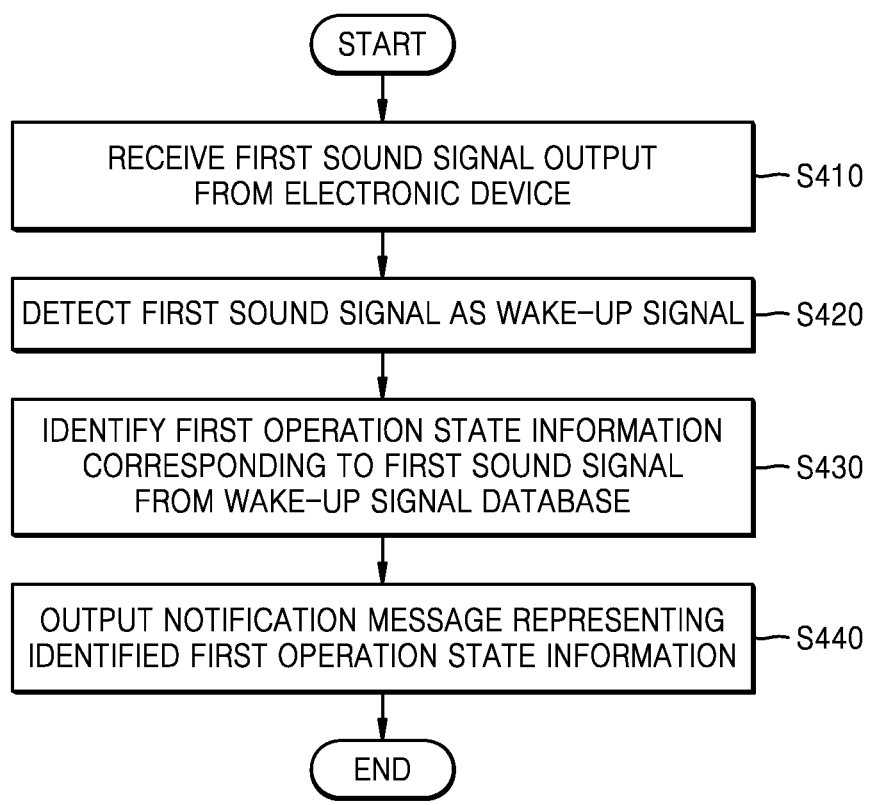
FIG. 4 illustrates a flowchart of a method of operating an electronic device according to an embodiment of the disclosure.

FIG. 4 illustrates a flowchart of a method of operating the electronic device 1000 according to an embodiment of the disclosure.

In operation S410, the electronic device 1000 may receive a first sound signal output from the household electrical device 2000. According to an embodiment of the disclosure, the electronic device 1000 may receive the first sound signal output from the speaker 2100 of the household electrical device 2000 through the microphone. The 'first sound signal' received by the electronic device 1000 through the microphone may be at least one of effect sound, bell sound, a melody, music, or a voice signal.

According to an embodiment of the disclosure, the electronic device 1000 may perform a pre-processing operation of removing noise (for example, a non-acoustic component) from the first sound signal output from the household electrical device 2000.

In operation S420, the electronic device 1000 may detect the first sound signal as a wake-up signal. According to an embodiment of the disclosure, the first sound signal may have been registered in advance as a wake-up signal. The electronic device 1000 may detect the first sound signal as a wake-up signal by comparing the first sound signal with a sound signal registered in advance as a wake-up signal. When the first sound signal is identical to the sound signal registered in advance or a similarity between the first sound signal and the sound signal registered in advance exceeds a preset threshold value according to a result of the comparing, the electronic device 1000 may detect the first sound signal received from the household electrical device 2000 as a wake-up signal. As the electronic device 1000 detects the first sound signal as a wake-up signal, the electronic device 1000 which operates in the standby mode or the sleep mode may wake up to be switched to the voice recognition mode of performing the voice recognition function.

According to another embodiment of the disclosure, when the first sound signal received from the household electrical device 2000 is not similar to the sound signal registered in advance, the electronic device 1000 may ignore sound signal without performing any operation responding to the first sound signal.

In operation S430, the electronic device 1000 may identify first operation state information corresponding to the first sound signal from the wake-up signal database 1600 (see FIGS. 2A and 3). According to an embodiment of the disclosure, the electronic device 1000 may compare the first sound signal with the plurality of sound signals 1610-1 to 1610-$n$ (see FIG. 2A) stored in advance in the wake-up signal database 1600 by using the wake-up signal sensing module 1310 (see FIGS. 2B and 3), and identify a sound signal corresponding to the first sound signal received from the household electrical device 2000 in operation S410 from among the plurality of sound signals 1610-1 to 1610-$n$ according to a result of the comparing. According to an embodiment of the disclosure, the electronic device 1000 may measure similarities between the first sound signal received from the household electrical device 2000 in operation S410 and the plurality of sound signals 1610-1 to 1610-*n* stored in advance in the wake-up signal database 1600, and identify a sound signal having a greatest similarity from among the plurality of sound signals 1610-1 to 1610-*n*.

The electronic device 1000 may identify first operation state information mapped to correspond to the identified sound signal from among the plurality of pieces of operation state information 1620-1 to 1620-*n* (see FIG. 2A) stored in advance in the wake-up signal database 1600.

In operation S440, the electronic device 1000 may output a notification message representing the identified first operation state information. According to an embodiment of the disclosure, the electronic device 1000 may output a voice message representing the operation state information through the speaker 1500 (see FIG. 3), but is not limited thereto. However, the disclosure is not limited to this, and the electronic device 1000 may output notification sound including at least one of effect sound, bell sound, a melody, music, or a song, set in advance according to the operation state information, through the speaker 1000.

According to an embodiment of the disclosure, the electronic device 1000 may display the notification sound in a form of text or a GUI.

Figure 5:
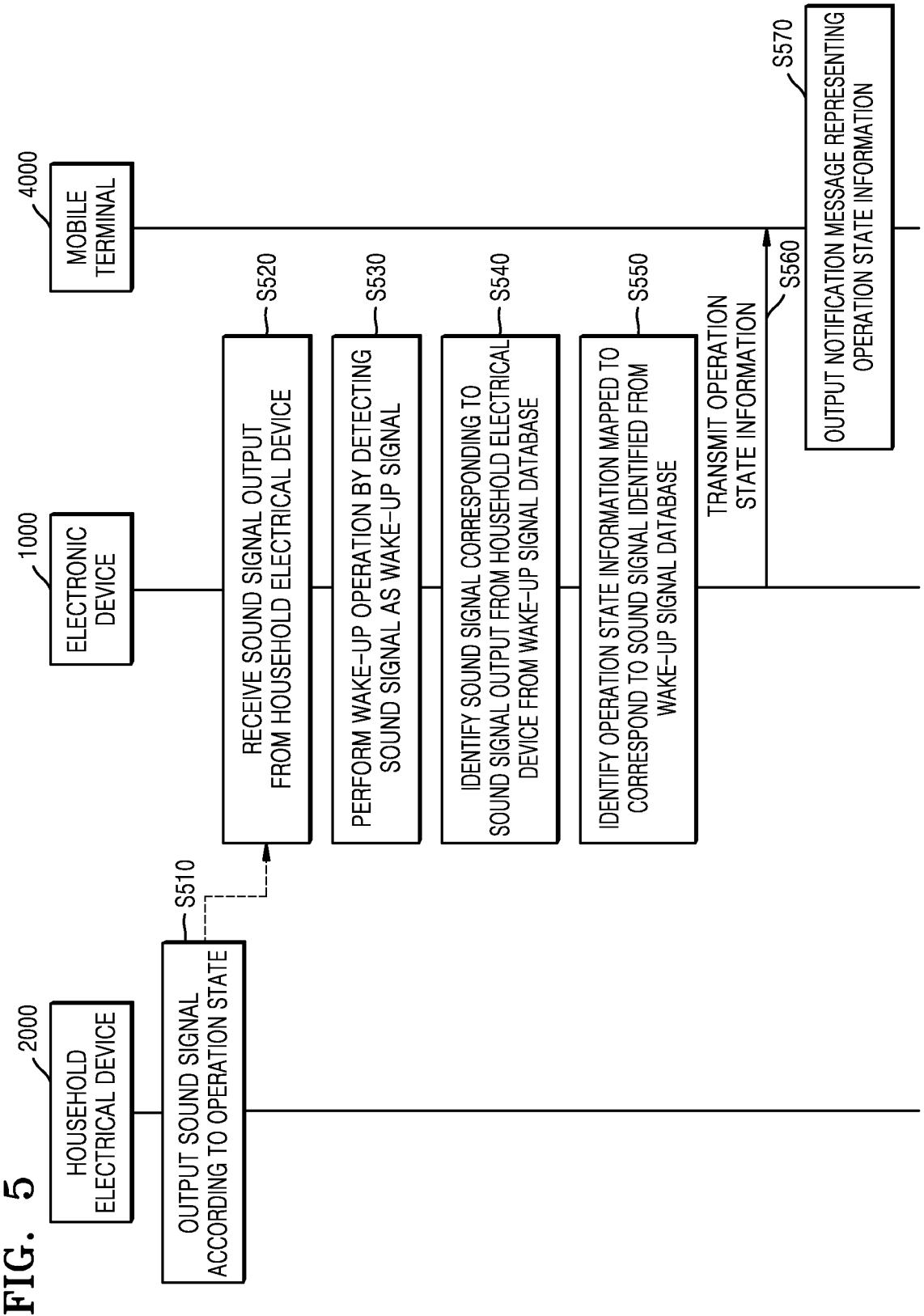
FIG. 5 illustrates a flowchart of a method of operating an electronic device, a household electrical device, and a mobile terminal, according to an embodiment of the disclosure.

FIG. 5 illustrates a flowchart of a method of operating the electronic device 1000 according to an embodiment of the disclosure, the household electrical device 2000, and the mobile terminal 4000.

FIG. 5 illustrates an embodiment in which the electronic device 1000 receives a sound signal output from the household electrical device 2000 without receiving a voice input uttered by a user.

In operation S510, the household electrical device 2000 may output a sound signal according to an operation state. The household electrical device 2000 may output a sound signal about state information representing starting, finishing, or progressing of a function and/or operation, or a sound signal representing an error or a failure. The sound signal output from the household electrical device 2000 may be at least one of effect sound, bell sound, a melody, music, or a sound signal. For example, when the household electrical device 2000 is a washing machine, the household electrical device 2000 may output a sound signal representing washing completion. When the household electrical device 2000 is a refrigerator, the household electrical device 2000 may output a sound signal representing door opening. When the household electrical device 2000 is a dryer, the household electrical device 2000 may output an error sound signal representing freezing of a drain hose.

In operation S520, the electronic device 1000 may receive the sound signal output from the household electrical device 2000. According to an embodiment of the disclosure, the electronic device 1000 may receive the sound signal output from the household electrical device 2000 through the microphone. The microphone may perform a pre-processing operation of removing noise (for example, a non-acoustic component) from the received sound signal.

In operation S530, the electronic device 1000 may perform a wake-up operation by detecting the sound signal as a wake-up signal. According to an embodiment of the disclosure, when a sound signal is received from the household electrical device 2000, the electronic device 1000 which operates in the standby mode or the sleep mode may perform a wake-up operation for performing a voice recognition function.

In operation S540, the electronic device 1000 may identify a sound signal corresponding to the sound signal output from the household electrical device 2000 from the wake-up signal database 1600 (see FIGS. 2A and 3). According to an embodiment of the disclosure, the electronic device 1000 may measure similarities between the sound signal received from the household electrical device 2000 in operation S520 and the plurality of sound signals 1610-1 to 1610-*n* stored in advance in the wake-up signal database 1600 (see FIGS. 2A and 3), and identify a sound signal having a greatest similarity from among the plurality of sound signals 1610-1 to 1610-*n*.

In operation S550, the electronic device 1000 may identify operation state information mapped to correspond to the sound signal identified from the wake-up signal database 1600. According to an embodiment of the disclosure, the electronic device 1000 may identify operation state information mapped to correspond to the identified sound signal from among the plurality of pieces of operation state information 1620-1 to 1620-*n* (see FIG. 2A) stored in advance in the wake-up signal database 1600. The electronic device 1000 may extract the operation state information from the wake-up signal database 1600.

In operation S560, the electronic device 1000 may transmit the extracted operation state information to the mobile terminal 4000. The electronic device 1000 may transmit the operation state information to the mobile terminal 4000 by using at least one data communication network of, for example, Wi-Fi, Bluetooth, zigbee, WFD, BLE, Wibro, WiMAX, SWAP, WiGig, or RF communication.

In operation S570, the mobile terminal 4000 may receive the operation state information from the electronic device 1000, and output a notification message representing the operation state information. According to an embodiment of the disclosure, the mobile terminal 4000 may display the notification message in a form of a pop-up message, but is not limited thereto. However, the mobile terminal 4000 may output a voice notification message representing the operation state information through the speaker 1500 (see FIG. 3).

Figure 6:
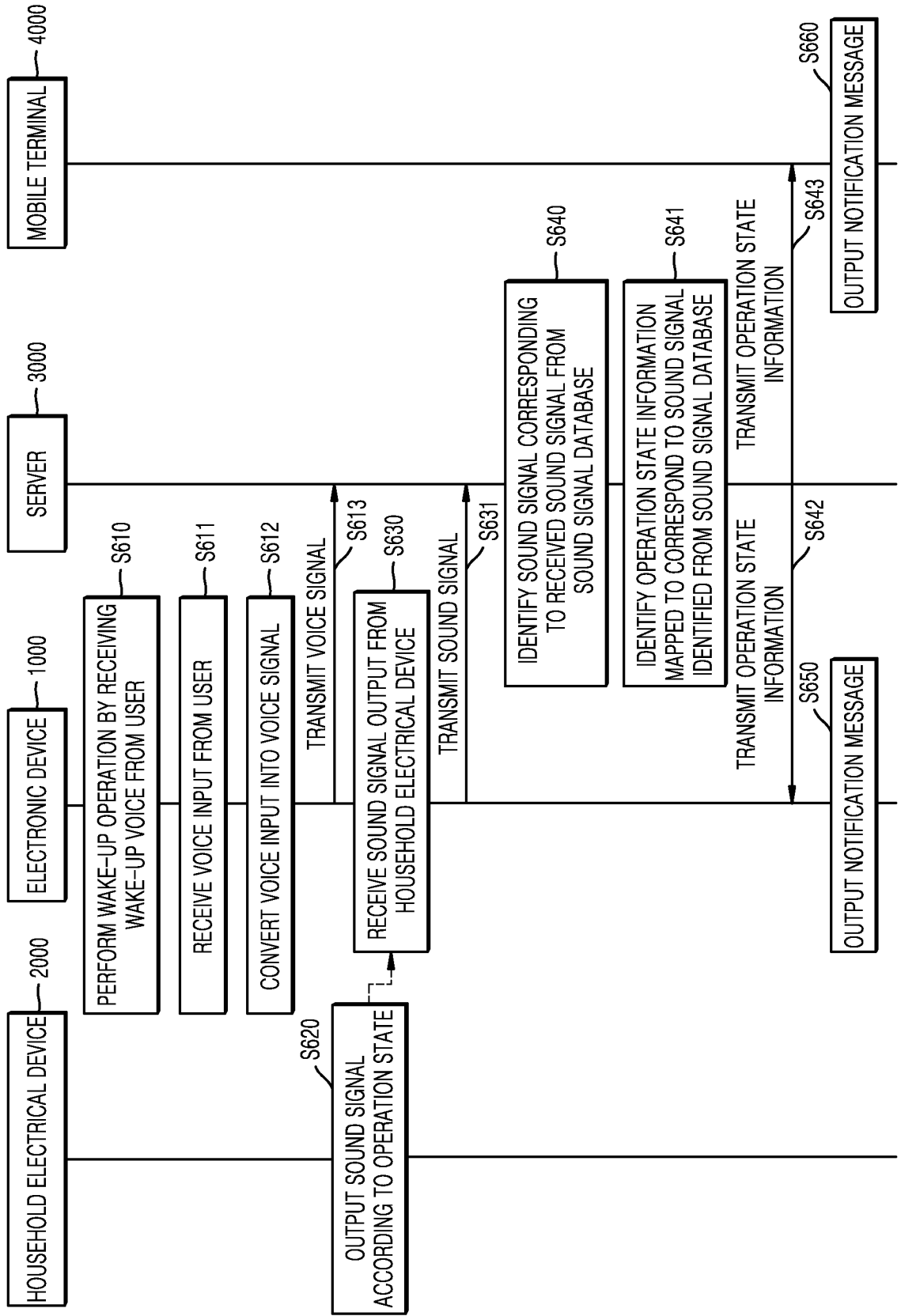
FIG. 6 illustrates a flowchart of a method of operating an electronic device, a household electrical device, a server, and a mobile terminal, according to an embodiment of the disclosure.

FIG. 6 illustrates a flowchart of a method of operating the electronic device 1000 according to an embodiment of the disclosure, the household electrical device 2000, the server 3000, and the mobile terminal 4000.

FIG. 6 illustrates an embodiment in which the electronic device 1000 receives a sound signal output from the household electrical device 2000 after receiving a voice input uttered by a user.

In FIG. 6, the electronic device 1000 and the mobile terminal 4000 may be devices registered in the server 3000 with the same user account.

In operation S610, the electronic device 1000 may perform a wake-up operation by receiving a wake-up voice from a user. The 'wake-up' voice may be a voice instruction for causing the electronic device 1000 being in a standby mode or a sleep mode to be switched to a voice recognition mode to perform a voice recognition function. The electronic device 1000 may receive a wake-up voice, such as, for example, 'Hi Bixby' or 'Hello Galaxy', uttered by a user.

The electronic device 1000 may perform a wake-up operation by detecting the wake-up voice as a wake-up signal. According to an embodiment of the disclosure, the electronic device 1000 may compare the received wake-up voice with a wake-up signal registered in advance by using the wake-up signal sensing module 1310 (see FIGS. 2B and 3), and, when the electronic device 1000 determines that the received wake-up voice is identical to the wake-up signal registered in advance according to a result of the comparing, the electronic device 1000 may perform a wake-up operation.

In operation S611, the electronic device 1000 may receive a voice input from a user. According to an embodiment of the disclosure, the electronic device 1000 may receive a voice input by using the microphone 1100 (see FIGS. 2B and 3). The 'voice input' may be a voice uttered by a user. The voice input may be, for example, "Let me know today's weather".

In operation S612, the electronic device 1000 may convert the voice input into a voice signal. According to an embodiment of the disclosure, the electronic device 1000 may obtain a voice signal by converting the voice input received through the microphone 1100 into a sound signal and removing noise (for example, a non-acoustic component) from the sound signal.

In operation S613, the electronic device 1000 may transmit the voice signal to the server 3000. The electronic device 1000 may transmit the voice signal to the server 3000 by using at least one data communication network of, for example, Wi-Fi, Bluetooth, zigbee, WFD, BLE, Wibro, WiMAX, SWAP, WiGig, or RF communication.

In operation S620, the household electrical device 2000 may output a sound signal according to an operation state. The household electrical device 2000 may output a sound signal about state information representing starting, finishing, or progressing of a function and/or operation, or a sound signal representing an error or a failure. Operation S620 may be the same as operation S510 illustrated in FIG. 5, and therefore, redundant descriptions will be omitted.

In operation S630, the electronic device 1000 may receive a sound signal output from the household electrical device 2000. The received sound signal may be a sound signal registered in advance as a wake-up signal. Operation S630 may be the same as operation S520 illustrated in FIG. 5, and therefore, redundant descriptions will be omitted.

In operation S631, the electronic device 1000 may transmit the sound signal to the server 3000. According to an embodiment of the disclosure, the electronic device 1000 may transmit the received sound signal to the server 3000 without detecting the sound signal as a wake-up signal. The electronic device 1000 may transmit the sound signal to the server 3000 by using at least one data communication network of, for example, Wi-Fi, Bluetooth, zigbee, WFD, BLE, Wibro, WiMAX, SWAP, WiGig, or RF communication.

In operation S640, the server 3000 may identify a sound signal corresponding to the sound signal received from the electronic device 1000 from the sound signal database 3400 (see FIG. 2B). The server 3000 may include the sound signal database 3400. The sound signal database 3400 may store the plurality of sound signals 3410-1 to 3410-n (see FIG. 2B) and the plurality of pieces of operation state information 3420-1 to 3420-n (see FIG. 2B) for the respective sound signals 3410-1 to 3410-n. According to an embodiment of the disclosure, the plurality of sound signals 3410-1 to 3410-n and the plurality of pieces of operation state information 3420-1 to 3420-n may have been stored in key-value types in the sound signal database 3400.

The server 3000 may measure similarities between the sound signal received from the electronic device 1000 and the plurality of sound signals 3410-1 to 3410-n stored in advance in the sound signal database 3400, and identify a sound signal having a greatest similarity from among the plurality of sound signals 3410-1 to 3410-n.

In operation S641, the server 3000 may identify operation state information mapped to correspond to the sound signal identified from the sound signal database 3400. According to an embodiment of the disclosure, the server 3000 may extract operation state information stored in a key-value type with the identified sound signal in the sound signal database 3400. For example, when the sound signal having a greatest similarity to the sound signal received from the electronic device 1000 from among the plurality of sound signals 3410-1 to 3410-n stored in advance in the sound signal database 3400 is a first sound signal, the server 3000 may extract first operation state information mapped to the first sound signal in a key-value type.

In operation S642, the server 3000 may transmit the operation state information to the electronic device 1000.

In operation S643, the server 3000 may transmit the operation state information to the mobile terminal 4000. In FIG. 6, the server 3000 is illustrated to transmit operation state information to both the electronic device 1000 and the mobile terminal 4000, but is not limited thereto. According to an embodiment of the disclosure, the server 3000 may perform operation S642 of transmitting the operation state information to the electronic device 1000, before operation S643 of transmitting operation state information to the mobile terminal 4000. Alternatively, the server 3000 may perform operation S643 before operation S642.

In operation S650, the electronic device 1000 may output a notification message. The electronic device 1000 may output a notification message representing the operation state information. According to an embodiment of the disclosure, the electronic device 1000 may output a voice message representing the operation state information through the speaker 1500 (see FIG. 3), but is not limited thereto. However, the electronic device 1000 may output notification sound including at least one of effect sound, bell sound, a melody, music, or a song, set in advance according to the operation state information, through the speaker 1500.

In operation S660, the mobile terminal 4000 may output a notification message representing the operation state information received from the server 3000. According to an embodiment of the disclosure, the mobile terminal 4000 may display a notification message in a form of a pop-up message, but is not limited thereto. However, the mobile terminal 4000 may output a voice notification message representing the operation state information through the speaker 1500.

According to an embodiment of the disclosure, the server 3000 may generate a notification message representing the operation state information. In this case, the server 3000 may generate a notification message representing the operation state information by using a NLG model 3316 (see FIG. 14). The generated notification message may be configured in a form of text. In this case, the server 3000 may transmit the notification message configured as text to the electronic device 1000 and the mobile terminal 4000. Each of the electronic device 1000 and the mobile terminal 4000 may output the notification message received from the server 3000.

Figure 7:
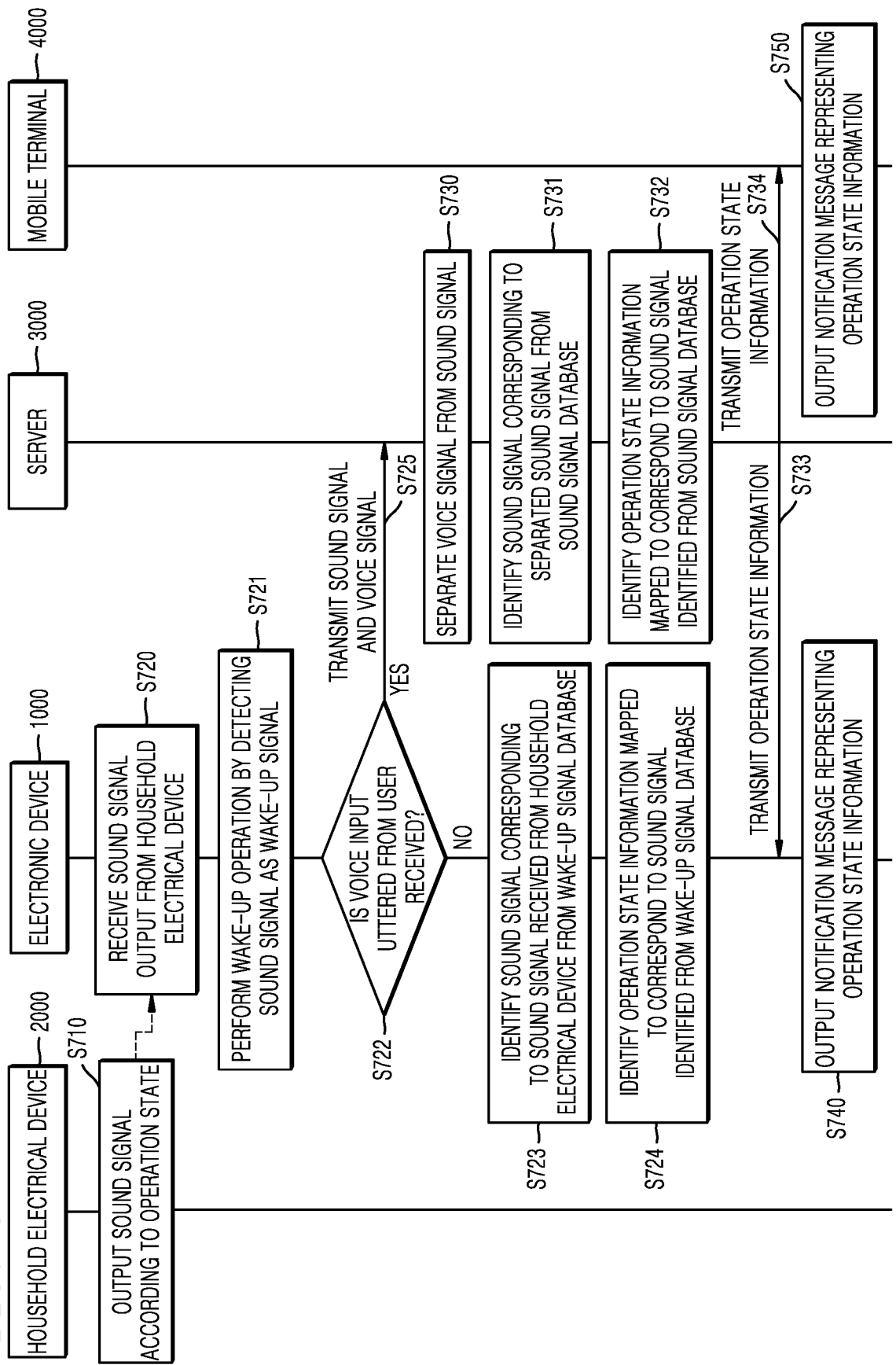
FIG. 7 illustrates a flowchart of a method of operating an electronic device, a household electrical device, a server, and a mobile terminal, according to an embodiment of the disclosure.

FIG. 7 illustrates a flowchart of a method of operating the electronic device 1000 according to an embodiment of the disclosure, the household electrical device 2000, the server 3000, and the mobile terminal 4000.

In FIG. 7, a case in which the electronic device 1000 receives a voice input uttered by a user after receiving a sound signal output from the household electrical device 2000 will be described as an example. For example, the electronic device 1000 may receive ending sound (wake-up signal) of a washing machine, and then receive a wake-up voice (for example, Hi Bixby) and a voice input (for example, Let me know today's weather) from a user.

In FIG. 7, the electronic device 1000 and the mobile terminal 4000 may be devices registered in advance in the server 3000 with the same user account.

In operation S710, the household electrical device 2000 may output a sound signal according to an operation state. The household electrical device 2000 may output a sound signal about state information representing starting, finishing, or progressing of a function and/or operation, or a sound signal representing an error or a failure. Operation S710 may be the same as operation S510 illustrated in FIG. 5, and therefore, redundant descriptions will be omitted.

In operation S720, the electronic device 1000 may receive a sound signal output from the household electrical device 2000. Operation S720 may be the same as operation S520 illustrated in FIG. 5, and therefore, redundant descriptions will be omitted.

In operation S721, the electronic device 1000 may perform a wake-up operation by detecting the sound signal as a wake-up signal. Operation S721 may be the same as operation S530 illustrated in FIG. 5, and therefore, redundant descriptions will be omitted.

In operation S722, the electronic device 1000 may determine whether a voice input uttered by a user is received. The voice input may be, for example, "Let me know today's whether".

When no voice input is received from the user, the electronic device 1000 may identify a sound signal corresponding to the sound signal received from the household electrical device 2000 from the wake-up signal database 1600 (see FIGS. 2A and 3), in operation S723.

In operation S724, the electronic device 1000 may identify operation state information mapped to correspond to the sound signal identified from the wake-up signal database 1600.

Operations S723 and S724 may be the same as operations S540 and S550 illustrated in FIG. 5, and therefore, redundant descriptions will be omitted.

When the electronic device 1000 receives a voice input uttered from the user, the electronic device 1000 may transmit the sound signal and a voice signal to the server 3000, in operation S725. The electronic device 1000 may transmit the sound signal and the voice signal to the server 3000 by using at least one data communication network of, for example, Wi-Fi, Bluetooth, zigbee, WFD, BLE, Wibro, WiMAX, SWAP, WiGig, or RF communication.

In operation S730, the server 3000 may separate the sound signal from the voice signal. According to an embodiment of the disclosure, the server 3000 may separate the sound signal from the voice signal by extracting the voice signal through a noise canceling function.

In operation S731, the server 3000 may identify a sound signal corresponding to the separated sound signal from the sound signal database 3400. According to an embodiment of the disclosure, the server 3000 may compare the sound signal separated in operation S730 with the plurality of sound signals 3410-1 to 3410-$n$ (see FIG. 2B) stored in advance in the sound signal database 3400 (see FIG. 2B), and identify a sound signal corresponding to the separated sound signal according to a result of the comparing. According to an embodiment of the disclosure, the server 3000 may measure similarities between the sound signal separated in operation S730 and the plurality of sound signals 3410-1 to 3410-$n$ stored in advance in the sound signal database 3400, and identify a sound signal having a greatest similarity from among the plurality of sound signals 3410-1 to 3410-$n$.

In operation S732, the server 3000 may identify operation state information mapped to correspond to the sound signal identified from the sound signal database 3400. According to an embodiment of the disclosure, the server 3000 may extract operation state information mapped to the identified sound signal in a key-value type from among the plurality of pieces of operation state information 3420-1 to 3420-$n$ (see FIG. 2B) stored in advance in the sound signal database 3400. For example, when the sound signal having the greatest similarity to the sound signal received from the electronic device 1000 from among the plurality of sound signals 3410-1 to 3410-$n$ stored in advance in the sound signal database 3400 is a first sound signal, the server 3000 may extract first operation state information mapped to the first sound signal in a key-value type.

In operation S733, the server 3000 may transmit the operation state information to the electronic device 1000.

In operation S734, the server 3000 may transmit the operation state information to the mobile terminal 4000.

In operation 740, the electronic device 1000 may output a notification message representing the operation state information. Operation S740 may be the same as operation S650 illustrated in FIG. 6, and therefore, redundant descriptions will be omitted.

In operation S750, the mobile terminal 4000 may output a notification message representing the operation state information. Operation S750 may be the same as operation S660 illustrated in FIG. 6, and therefore, redundant descriptions will be omitted.

In the embodiment illustrated in FIG. 7, the electronic device 1000 may determine whether to process a sound signal output from the household electrical device 2000, according to whether a voice input is received from a user after a wake-up voice is received.

More specifically, when a voice input is received from a user, the electronic device 1000 may transmit both the sound signal and the voice signal to the server 3000 in operation S725, and the server 3000 may identify operation state information corresponding to the sound signal and transmit the operation state information to the electronic device 1000. The electronic device 1000 may output a notification message representing the operation state information received from the server 3000.

When no voice input is received from the user in operation S722, the electronic device 1000 may identify, as an on-device, operation state information corresponding to the sound signal from the wake-up signal database 1600, without any intervention of the server 3000, and output a notification message representing the identified operation state information.

Figure 8:
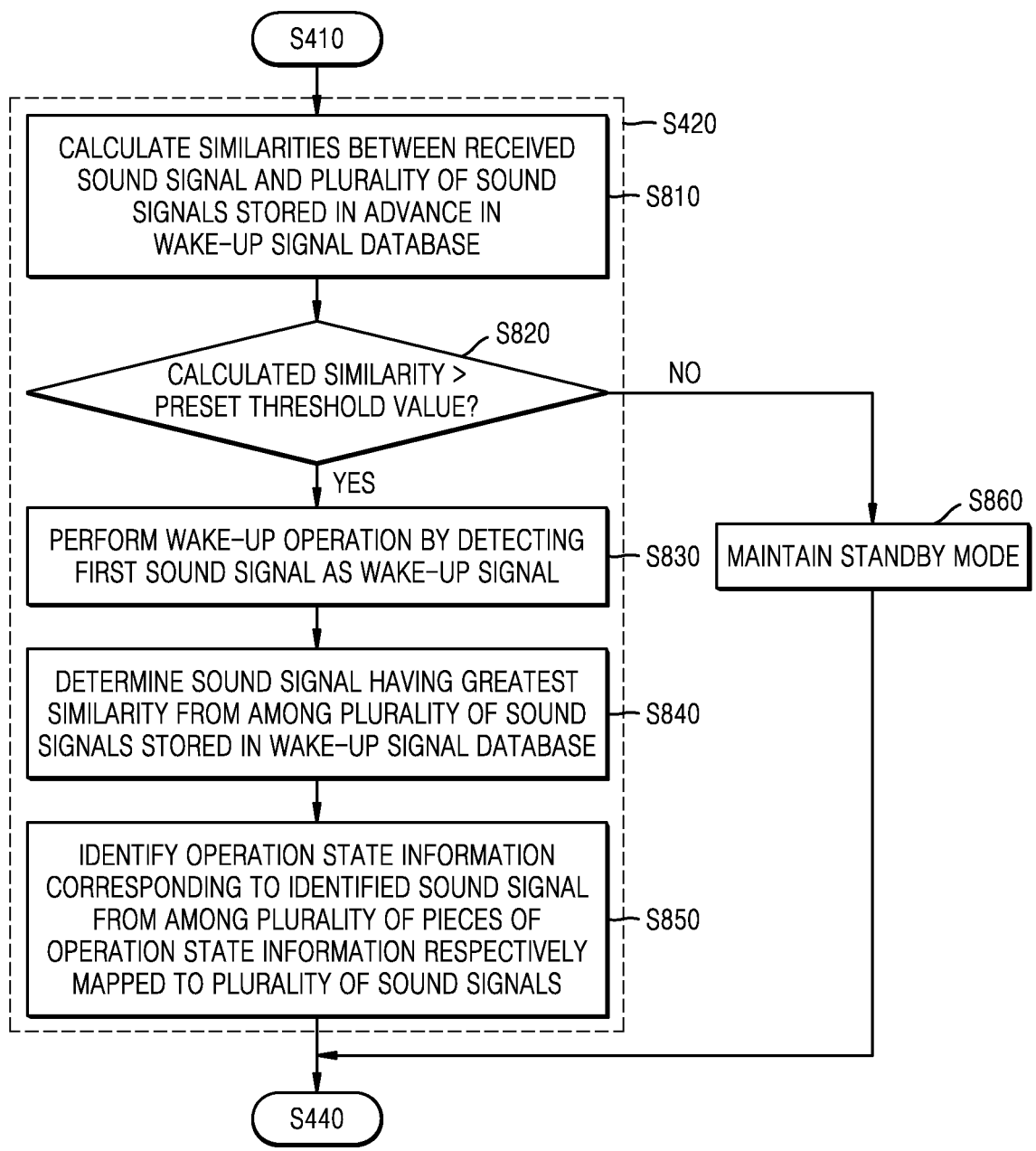
FIG. 8 illustrates a flowchart of a method, performed by an electronic device, of identifying operation state information corresponding to a sound signal output from a household electrical device according to an embodiment of the disclosure.

FIG. 8 illustrates a flowchart of a method, performed by the electronic device 1000, of identifying operation state information corresponding to a sound signal output from a household electrical device, according to an embodiment of the disclosure.

Operations S810 to S830 illustrated in FIG. 8 may be detailed operations of operation S420 illustrated in FIG. 4. Operations S840 to S850 illustrated in FIG. 8 may be detailed operations of operation S430 illustrated in FIG. 4. Operation S810 illustrated in FIG. 8 may be performed after operation S410 of FIG. 4 is performed. After operation S850 illustrated in FIG. 8 is performed, operation S440 of FIG. 4 may be performed.

In operation S810, the electronic device 1000 may calculate similarities between the received first sound signal and the plurality of sound signals 1610-1 to 1610-*n* (see FIG. 2A) stored in advance in the wake-up signal database 1600 (see FIGS. 2A and 3). According to an embodiment of the disclosure, the electronic device 1000 may perform pre-processing, such as frequency sampling, offset processing, etc., on a sound signal received from the household electrical device 2000, and convert the pre-processed sound signal into an acoustic feature vector. For example, the electronic device 1000 may convert the sound signal into the acoustic feature vector by using at least one of mel-frequency cepstrum (MFCCs), filter-bank (FBANK), or feature space maximum likelihood linear regression (fMLLR). The electronic device 1000 may calculate probability values with which the acoustic feature vector is classified into the plurality of sound signals 1610-1 to 1610-*n* (see FIG. 2A) stored in advance in the wake-up signal database 1600, by using a classifier. The classifier may be at least one of, for example, logistic regression, SVM, decision tree, or random forest. The electronic device 1000 may calculate similarities between the sound signal received from the household electrical device 2000 and the plurality of sound signals 1610-1 to 1610-*n* stored in advance in the wake-up signal database 1600, based on the calculated probability values. The probability values may be values ranging from 0 to 1. For example, a probability value being closer to 1 means a higher similarity.

However, a method of calculating a similarity of a sound signal in the electronic device 1000 is not limited to the above-described method. According to an embodiment of the disclosure, the electronic device 1000 may calculate similarities between sound signals by using an algorithm for calculating a cross-correlation between wavelengths of frequencies of sound signals, cosine similarity, or a known method of measuring similarities between sound signals.

In operation S820, the electronic device 1000 may compare the calculated similarities with a preset threshold value.

When a calculated similarity exceeds the preset threshold value, the electronic device 1000 may perform a wake-up operation by detecting the first sound signal as a wake-up signal, in operation S830. According to an embodiment of the disclosure, there may be one or more sound signals of which a calculated similarity to the first sound signal among the plurality of sound signals 1610-1 to 1610-*n* stored in the wake-up signal database 1600 exceeds the preset threshold value.

According to an embodiment of the disclosure, when a similarity between the first sound signal and the plurality of sound signals 1610-1 to 1610-*n* stored in the wake-up signal database 1600 exceeds the preset threshold value, the electronic device 1000 which operates in the standby mode or the sleep mode may perform a wake-up operation for switching from the standby mode to the voice recognition function.

In operation S840, the electronic device 1000 may determine a sound signal having a greatest similarity from among the plurality of sound signals 1610-1 to 1610-*n* stored in the wake-up signal database 1600. The electronic device 1000 may extract at least one sound signal of which a similarity calculated in operation S810 exceeds the preset threshold value from among the plurality of sound signals 1610-1 to 1610-*n*. According to an embodiment of the disclosure, the electronic device 1000 may identify a sound signal having a greatest similarity from among the extracted at least one sound signal.

The electronic device 1000 may determine the identified sound signal to be a sound signal corresponding to the sound signal received from the household electrical device 2000.

In operation S850, the electronic device 1000 may identify operation state information corresponding to the identified sound signal from among the plurality of pieces of operation state information 1620-1 to 1620-*n* (see FIG. 2A) stored in the wake-up signal database 1600. The wake-up signal database 1600 may store the plurality of pieces of operation state information 1620-1 to 1620-*n* mapped to the respective sound signals 1610-1 to 1610-*n*. According to an embodiment of the disclosure, the plurality of sound signals 1610-1 to 1610-*n* and the plurality of pieces of operation state information 1620-1 to 1620-*n* may be stored in key-value types in the wake-up signal database 1600. The electronic device 1000 may identify operation state information mapped to the identified sound signal in a key-value type from the wake-up signal database 1600.

When the calculated similarity is smaller than or equal to the preset threshold value according to the result of the comparing, the electronic device 1000 may be maintained in the standby mode. For example, when a sound signal output from a refrigerator has not been stored in the wake-up signal database 1600, the electronic device 1000 may determine that the calculated similarity is smaller than or equal to the preset threshold value, and be maintained in the standby mode without waking up.

Figure 9:
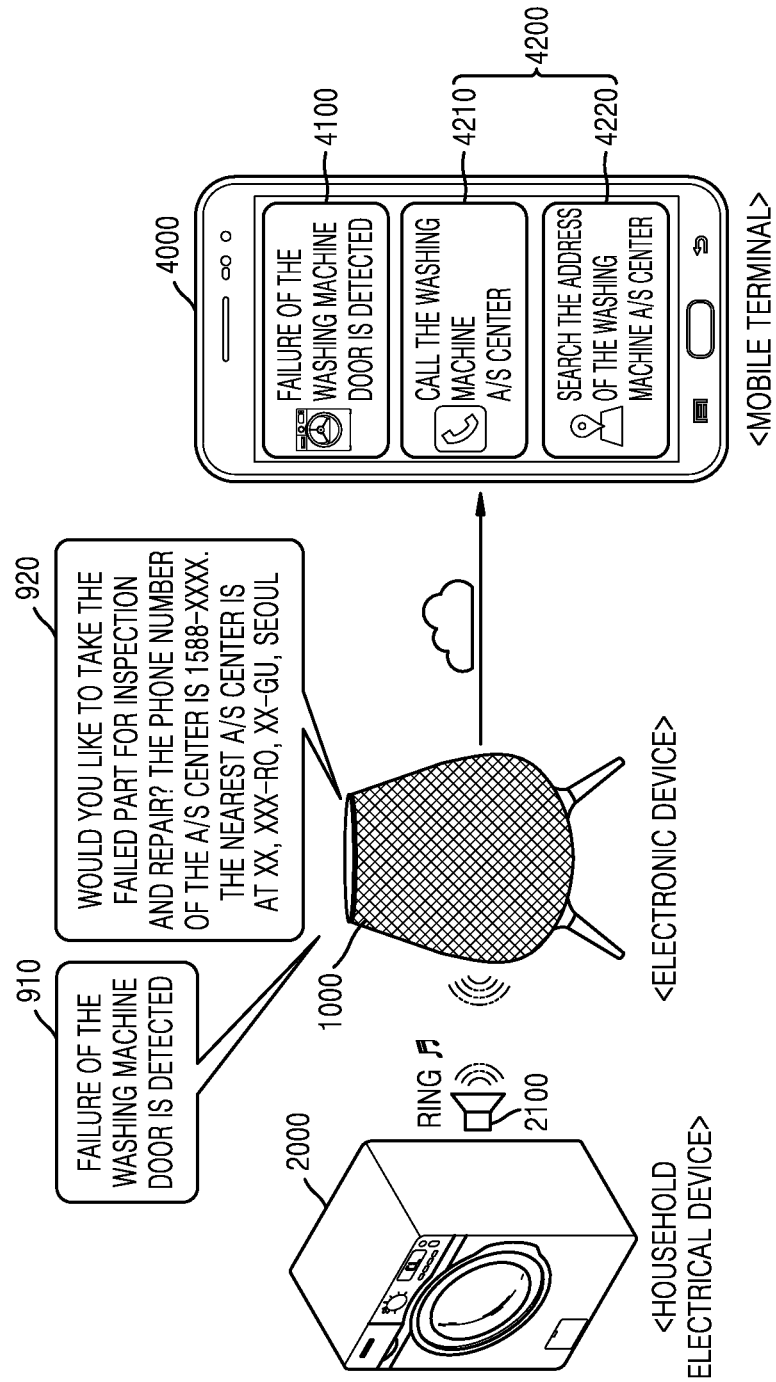
FIG. 9 illustrates an operation, by an electronic device, of outputting operation state information of a household electrical device and recommendation information for a follow-up operation based on a sound signal output from the household electrical device, and transmitting the operation state information and the recommendation information for the follow-up operation to a mobile terminal, according to an embodiment of the disclosure.

FIG. 9 illustrates an operation, by the electronic device 1000, of outputting operation state information of the household electrical device 2000 and recommendation information for a follow-up operation based on a sound signal output from the household electrical device 2000 and transmitting the operation state information and the recommendation information for the follow-up operation to the mobile terminal 4000, according to an embodiment of the disclosure.

Referring to FIG. 9, the electronic device 1000 may receive a sound signal output from the speaker 2100 of the household electrical device 2000, and output a notification message 910 representing operation state information corresponding to the received sound signal and a follow-up operation recommendation message 920. An embodiment in which the electronic device 1000 wakes up by detecting a sound signal received from the household electrical device 2000 as a wake-up signal, and outputs the notification message 910 representing operation state information corresponding to the sound signal may be the same as that described above with reference to FIGS. 1 to 8, and therefore, redundant descriptions will be omitted.

Follow-up operation information may be information about an operation recommended for a user as a follow-up operation related to the operation state information. For example, when the household electrical device 2000 is a 'washing machine' and operation state information is 'door failure of the washing machine', follow-up operation information may be 'information about failure inspection and repair of the washing machine'. For example, the follow-up operation information may include 'phone number of the A/S center' or 'location information of the A/S center'.

The electronic device 1000 may output the follow-up operation recommendation message 920 for recommending follow-up operation information for a user. In the embodiment illustrated in FIG. 9, the electronic device 1000 may output, as the follow-up operation recommendation message 920, a message "Would you like to take the failed part for inspection and repair? The phone number of the A/S center is 1588-XXXX. The nearest A/S center is at XX, XXX-ro, XX-gu, Seoul".

The electronic device 1000 may transmit the operation state information and the follow-up operation information to the mobile terminal 4000. The mobile terminal 4000 may receive the operation state information and the follow-up operation information from the electronic device 1000, and output a notification message 4100 representing the received operation state information and a follow-up operation recommendation message 4200 for recommending a follow-up operation. According to an embodiment of the disclosure, the mobile terminal 4000 may display the notification message 4100 representing the operation state information of the household electrical device 2000 and the follow-up operation recommendation message 4200 according to the operation station information, in a form of a pop-up message. According to an embodiment of the disclosure, the mobile terminal 4000 may display the follow-up operation recommendation message 4200 in a form of a 'shortcut link' for executing a related application capable of performing the follow-up operation. In the embodiment illustrated in FIG. 9, the mobile terminal 4000 may display, as the notification message 4100 representing the operation state information of the household electrical device 2000, "failure of the washing machine door is detected", and display, as the follow-up operation recommendation message 4200, a phone application shortcut link 4210 of "call the washing machine A/S center" and a map application shortcut link 4220 of "search the address of the washing machine A/S center".

According to another embodiment of the disclosure, the mobile terminal 4000 may output a voice message for representing operation state information of the household electrical device 2000 and recommending a follow-up operation through the speaker 2100.

The electronic device 1000 according to an embodiment of the disclosure, as illustrated in FIG. 9, may improve user convenience by outputting the follow-up operation recommendation message 920 for recommending a follow-up operation according to an operation state of the household electrical device 2000, together with the notification message 910 representing operation state information of the household electrical device 2000 based on a sound signal output from the household electrical device 2000. Particularly, by informing a phone number or address of an A/S center when any problem in operation state of the household electrical device 2000, such as a stop, failure, error, etc. of the household electrical device 2000, occurs, a user may intuitively detect a follow-up operation without himself/herself searching a related follow-up operation, resulting in an improvement of efficiency and satisfaction.

A method in which the electronic device 1000 outputs the follow-up operation recommendation message 920 related to the operation state information, in addition to the notification message 910 representing the operation state information according to the sound signal output from the household electrical device 2000 will be described in detail with reference to FIGS. 10 to 12, below.

Figure 10:
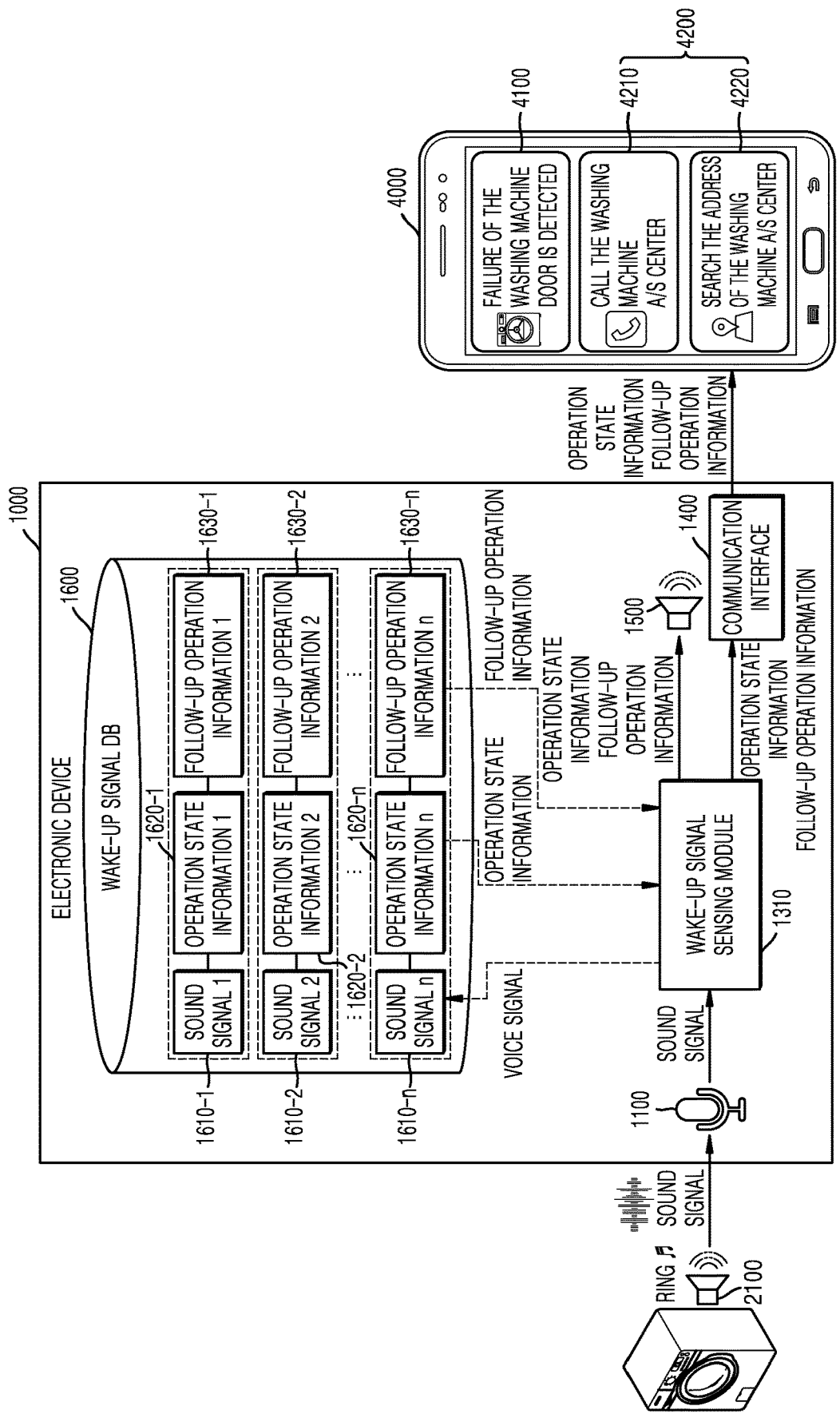
FIG. 10 illustrates an embodiment of an electronic device outputting operation state information of a household electrical device and recommendation information for a follow-up operation based on a sound signal output from the household electrical device, and transmitting the operation state information and the recommendation information for the follow-up operation to a mobile terminal, according to an embodiment of the disclosure.

FIG. 10 illustrates an embodiment of the electronic device 1000 outputting operation state information of the household electrical device 2000 and recommendation information for a follow-up operation based on a sound signal output from the household electrical device 2000, and transmitting the operation state information and the recommendation information for the follow-up operation to the mobile terminal 4000, according to an embodiment of the disclosure.

Referring to FIG. 10, the electronic device 1000 may include the microphone 1100, the wake-up signal sensing module 1310, the communication interface 1400, the speaker 1500, and the wake-up signal database 1600. In FIG. 10, essential components for describing functions and/or operations of the electronic device 1000 are illustrated. However, components included in the electronic device 1000 are not limited to those illustrated in FIG. 10.

The electronic device 1000 may receive a sound signal output from the speaker 2100 of the household electrical device 2000 through the microphone 1100. A 'sound signal' received through the microphone 1100 may be at least one of effect sound, bell sound, a melody, music, or a voice signal.

The wake-up signal sensing module 1310 may be a module configured to detect a sound signal output from the household electrical device 2000 as a wake-up signal. The wake-up signal sensing module 1310 may compare the sound signal detected as the wake-up signal with the plurality of sound signals 1610-1 to 1610-*n* stored in advance in the wake-up signal database 1600, and identify a sound signal corresponding to the sound signal received from the household electrical device 2000 from among the plurality of sound signals 1610-1 to 1610-*n* according to a result of the comparing. The wake-up signal sensing module 1310 may extract operation state information and follow-up operation information mapped to correspond to the identified sound signal from among the plurality of pieces of operation state information 1620-1 to 1620-*n* and the plurality of pieces of follow-up operation information 1630-1 to 1630-*n* stored in advance in the wake-up signal database 1600.

The wake-up signal database 1600 may store a sound signal of the household electrical device 2000, obtained in advance, operation state information of the household electrical device 2000, indicated by the sound signal, and information about a follow-up operation that is recommended in connection with the operation state information. The plurality of sound signals 1610-1 to 1610-*n*, the plurality of pieces of operation state information 1620-1 to 1620-*n* respectively related to the plurality of sound signals 1610-1 to 1610-*n*, and the plurality of pieces of follow-up operation information 1630-1 to 1630-*n* respectively related to the plurality of pieces of operation state information 1620-1 to 1620-*n* may be stored in the wake-up signal database 1600. According to an embodiment of the disclosure, the plurality of sound signals 1610-1 to 1610-*n* may be mapped as keys and stored in the wake-up signal database 1600, and the related pieces of the plurality of pieces of operation state information 1620-1 to 1620-*n* and the plurality of pieces of follow-up operation information 1630-1 to 1630-*n* may be mapped as values and stored in the wake-up signal database 1600.

The plurality of pieces of follow-up operation information 1630-1 to 1630-*n* may be information about an operation recommended for a user as a follow-up operation related to an operation state of the household electrical device 2000. According to an embodiment of the disclosure, the plurality of pieces of follow-up operation information 1630-1 to 1630-*n* may be obtained by a user input received through a registration process, and stored in the wake-up signal database 1600, but is not limited thereto. However, the disclosure is not limited to, and the plurality of pieces of follow-up operation information 1630-1 to 1630-*n* may be obtained from the server 3000.

As described above, the plurality of pieces of follow-up operation information 1630-1 to 1630-*n* may be mapped to respectively correspond to the plurality of sound signals 1610-1 to 1610-*n* and the plurality of pieces of operation state information 1620-1 to 1620-*n*, and then stored in the wake-up signal database 1600. According to an embodiment of the disclosure, one piece of operation state information may be mapped to at least one piece of follow-up operation information. For example, when operation state information is 'door failure of the washing machine', follow-up operation information may include 'phone number of the A/S center' and 'location information of the A/S center'.

The wake-up signal sensing module 1310 may identify operation state information corresponding to the sound signal output from the household electrical device 2000 from the wake-up signal database 1600, and extract the operation state information. An embodiment of identifying operation state information corresponding to a sound signal received from the household electrical device 2000 in the wake-up signal sensing module 1310 may be the same as that described above with reference to FIGS. 1 to 8, and therefore, detailed descriptions will be omitted.

The wake-up signal sensing module 1310 may identify follow-up operation information mapped to correspond to the identified operation state information from the wake-up signal database 1600. For example, when a first sound signal 1610-1 is identified as a signal corresponding to the sound signal received from the household electrical device 2000, the wake-up signal sensing module 1310 may identify first operation state information 1620-1 and first follow-up operation information 1630-1 mapped to correspond to the first sound signal 1610-1 from the wake-up signal database 1600. The wake-up signal sensing module 1310 may extract the identified first operation state information 1620-1 and the identified first follow-up operation information 1630-1 from the wake-up signal database 1600.

The wake-up signal sensing module 1310 may provide the extracted operation state information and the extracted follow-up information to the speaker 1500 or the communication interface 1400.

The speaker 1500 may output a notification message representing the operation state information provided from the wake-up signal sensing module 1310 and a follow-up operation recommendation message for recommending a follow-up operation. According to an embodiment of the disclosure, the speaker 1500 may output a voice message representing operation state information and follow-up operation information.

The communication interface 1400 may transmit the operation state information and the follow-up operation information to the mobile terminal 4000 of the user through a wired or wireless communication network.

The mobile terminal 4000 may receive the operation state information and the follow-up operation information from the communication interface 1400 of the electronic device 1000, and output a notification message representing the operation state information and a follow-up operation recommendation message 4200 for recommending a follow-up operation. According to an embodiment of the disclosure, the mobile terminal 4000 may display the follow-up operation recommendation message 4200 in a form of a 'shortcut link' for executing a related application capable of performing the follow-up operation. For example, the mobile terminal 4000 may display, as the notification message 4100 representing the operation state information of the household electrical device 2000, "failure of the washing machine door is detected", and display, as the follow-up operation recommendation message 4200, a phone application shortcut link 4210 of "call the washing machine A/S center" and a map application shortcut link 4220 of "search the address of the washing machine A/S center".

Figure 11:
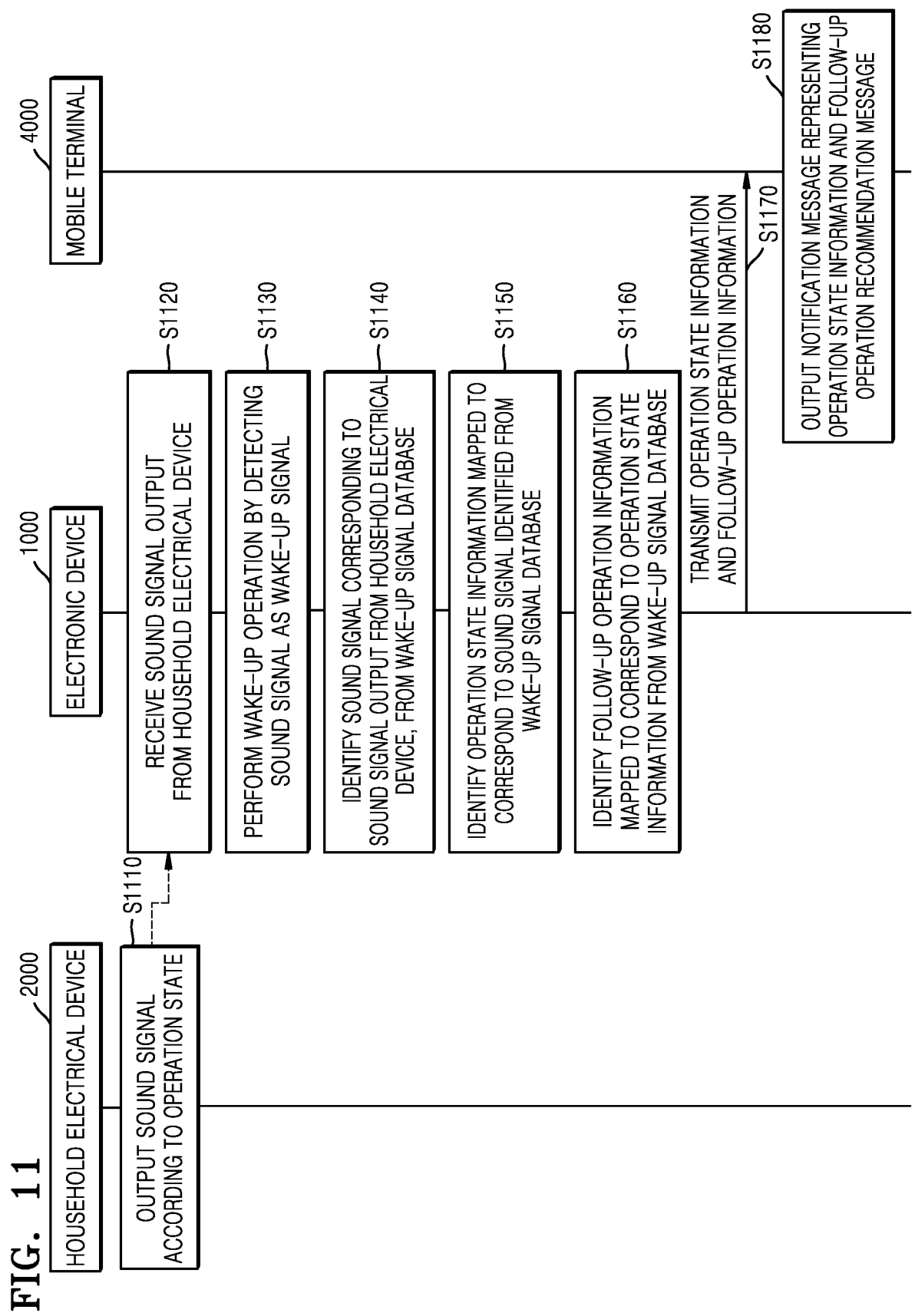
FIG. 11 illustrates a flowchart of a method of operating an electronic device, a household electrical device, and a mobile terminal, according to an embodiment of the disclosure.

FIG. 11 illustrates a flowchart of a method of operating the electronic device 1000 according to an embodiment of the disclosure, the household electrical device 2000, and the mobile terminal 4000.

FIG. 11 illustrates an embodiment of receiving a sound signal output from the household electrical device 2000 and providing operation state information and follow-up operation information corresponding to the received sound signal, in the electronic device 1000. In the embodiment illustrated in FIG. 11, the electronic device 1000 may process a sound signal as an on-device without any intervention of the server 3000.

In operation S1110, the household electrical device 2000 may output a sound signal according to an operation state. The household electrical device 2000 may output a sound signal about state information representing starting, finishing, or progressing of a function and/or operation, or a sound signal representing an error or a failure. Operation S1110 may be the same as operation S510 illustrated in FIG. 5, and therefore, redundant descriptions will be omitted.

In operation S1120, the electronic device 1000 may receive the sound signal output from the household electrical device 2000.

In operation S1130, the electronic device 1000 may perform a wake-up operation by detecting the sound signal as a wake-up signal.

In operation S1140, the electronic device 1000 may identify a sound signal corresponding to the sound signal output from the household electrical device 2000, from the wake-up signal database 1600 (see FIG. 10).

In operation S1150, the electronic device 1000 may identify operation state information mapped to correspond to the sound signal identified from the wake-up signal database 1600.

Operations S1120 to S1150 may be the same as operations S520 to S550 illustrated in FIG. 5, and therefore, redundant descriptions will be omitted.

In operation S1160, the electronic device 1000 may identify follow-up operation information mapped to correspond to the operation state information from the wake-up signal database 1600. The wake-up signal database 1600 may store the plurality of sound signals 1610-1 to 1610-$n$ (see FIG. 10), the plurality of pieces of operation state information 1620-1 to 1620-$n$ (see FIG. 10), and the plurality of pieces of follow-up operation information 1630-1 to 1630-$n$ (see FIG. 10). According to an embodiment of the disclosure, the plurality of sound signals 1610-1 to 1610-$n$ and the plurality of pieces of operation state information 1620-1 to 1620-$n$ may be mapped in key-value types and then stored in the wake-up signal database 1600. For example, the plurality of sound signals 1610-1 to 1610-$n$ may be mapped as keys and stored in the wake-up signal database 1600, and the corresponding pieces of the plurality of pieces of operation state information 1620-1 to 1620-$n$ and the plurality of pieces of follow-up operation information 1630-1 to 1630-$n$ may be mapped as values and stored in the wake-up signal database 1600.

The electronic device 1000 may identify follow-up operation information mapped to correspond to the operation state information identified in operation S1150 from the wake-up signal database 1600. For example, when the identified operation state information is first operation state information, the electronic device 1000 may identify first follow-up operation information mapped to correspond to the first operation state information from the wake-up signal database 1600.

In operation S1170, the electronic device 1000 may transmit the operation state information and the follow-up operation information to the mobile terminal 4000. The electronic device 1000 may transmit the operation state information and the follow-up operation information to the mobile terminal 4000 by using at least one data communication network of, for example, Wi-Fi, Bluetooth, zigbee, WFD, BLE, Wibro, WiMAX, SWAP, WiGig, or RF communication.

In operation S1180, the mobile terminal 4000 may receive the operation state information and the follow-up operation information from the electronic device 1000, and output a notification message representing the operation state information and a follow-up operation recommendation message for recommending a follow-up operation. According to an embodiment of the disclosure, the mobile terminal 4000 may display the notification message and the follow-up operation recommendation message in a form of a pop-up message, but is not limited thereto. However, the mobile terminal 4000 may output a voice notification message representing the operation state information and follow-up operation information through the speaker 1500 (see FIG. 3).

Figure 12:
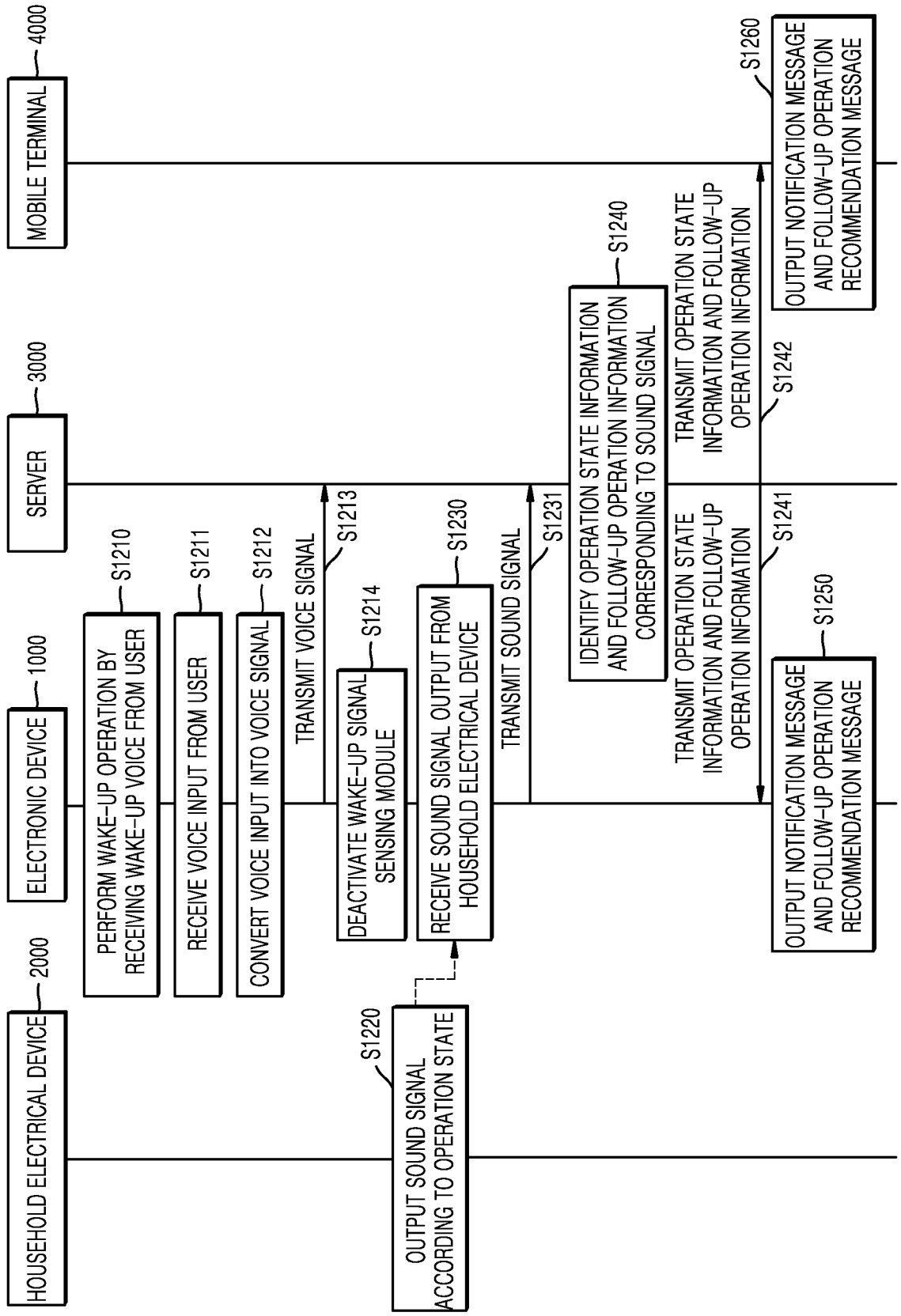
FIG. 12 illustrates a flowchart of a method of operating an electronic device, a household electrical device, a server, and a mobile terminal, according to an embodiment of the disclosure.

FIG. 12 illustrates a flowchart of a method of operating the electronic device 1000 according to an embodiment of the disclosure, the household electrical device 2000, the server 3000, and the mobile terminal 4000.

FIG. 12 illustrates an embodiment of receiving a voice input uttered by a user, then receiving a sound signal output from the household electrical device 2000, and providing operation state information and follow-up operation information corresponding to the sound signal in the electronic device 1000.

In FIG. 12, the electronic device 1000 and the mobile terminal 4000 may be devices registered in advance in the server 3000 with the same user account.

In operation S1210, the electronic device 1000 may perform a wake-up operation by receiving a wake-up voice from the user. The 'wake-up voice' may be a voice instruction for causing the electronic device 1000 being in a standby mode or a sleep mode to be switched to a voice recognition mode for performing a voice recognition function. The 'wake-up voice' may include, for example, 'Hi Bixby' or 'Hello Galaxy', etc.

The electronic device 1000 may perform a wake-up operation by detecting the wake-up voice as a wake-up signal. According to an embodiment of the disclosure, the electronic device 1000 may compare the received wake-up voice with a wake-up signal registered in advance by using the wake-up signal sensing module 1310 (see FIGS. 2B and 3), and when the electronic device 1000 determines that the received wake-up voice is identical to the wake-up signal registered in advance, the electronic device 1000 may perform a wake-up operation.

In operation S1211, the electronic device 1000 may receive a voice input from the user. According to an embodiment of the disclosure, the electronic device 1000 may receive the voice input by using the microphone 1100 (see FIGS. 2B and 3). The 'voice input' may be a voice uttered by the user. The voice input may be, for example, "Let me know today's weather".

In operation S1212, the electronic device 1000 may convert the voice input into a voice signal. According to an embodiment of the disclosure, the electronic device 1000 may obtain a voice signal by converting the voice input received from the microphone 1100 (see FIG. 10) into a sound signal and removing noise (for example, a non-acoustic component) from the sound signal.

In operation S1213, the electronic device 1000 may transmit the voice signal to the server 3000. In operation S1214, the electronic device 1000 may deactivate wake-up signal sensing module.

In operation S1220, the household electrical device 2000 may output a sound signal according to an operation state. The household electrical device 2000 may output a sound signal about state information representing starting, finishing, or progressing of a function and/or operation, or a sound signal representing an error or a failure.

In operation S1230, the electronic device 1000 may receive the sound signal output from the household electrical device 2000.

In operation S1231, the electronic device 1000 may transmit the sound signal to the server 3000. According to an embodiment of the disclosure, the electronic device 1000 may transmit the received sound signal to the server 3000, without operating the wake-up signal sensing module 1310. The electronic device 1000 may transmit the sound signal to the server 3000 by using at least one data communication network of, for example, Wi-Fi, Bluetooth, zigbee, WFD, BLE, Wibro, WiMAX, SWAP, WiGig, or RF communication.

In operation S1240, the server 3000 may identify operation state information and follow-up operation information corresponding to the sound signal. The server 3000 may include the sound signal database 3400. According to an embodiment of the disclosure, the sound signal database 3400 may store a plurality of sound signals, a plurality of pieces of operation state information, and a plurality of pieces of follow-up operation information. According to an embodiment of the disclosure, the plurality of sound signals, the plurality of pieces of operation state information, and the plurality of pieces of follow-up operation information may be mapped in key-value types and stored in the sound signal database 3400. For example, the plurality of sound signals may be stored as keys in the sound signal database 3400, and the corresponding pieces of the plurality of pieces of operation state information and the plurality of pieces of follow-up operation information may be stored as values in the sound signal database 3400.

The server 3000 may measure similarities between the sound signal received from the electronic device 1000 and the plurality of sound signals stored in advance in the sound signal database 3400, and identify a sound signal having a greatest similarity from among the plurality of sound signals. The server 3000 may identify operation state information and follow-up operation information mapped to correspond to the sound signal identified by the sound signal database 3400. According to an embodiment of the disclosure, the server 3000 may extract operation state information and follow-up operation information mapped to the identified sound signal in a key-value type and stored in the sound signal database 3400. For example, when a sound signal having a greatest similarity to the sound signal received from the electronic device 1000 from among the plurality of sound signals stored in advance in the sound signal database 3400 is a first sound signal, the server 3000 may extract first operation state information and first follow-up operation information mapped to the first sound signal in a key-value type.

In operation S1241, the server 3000 may transmit the operation state information and the follow-up operation information to the electronic device 1000. In operation S1250, the electronic device 1000 may output notification message and follow-up operation recommendation message.

In operation 51242, the server 3000 may transmit the operation state information and the follow-up operation information to the mobile terminal 4000. In operation S1260, the mobile terminal 4000 may output notification message and follow-up operation recommendation message. In FIG. 12, the server 3000 is illustrated to transmit the operation state information and the follow-up operation information to both the electronic device 1000 and the mobile terminal 4000, but is not limited thereto.

Figure 13:
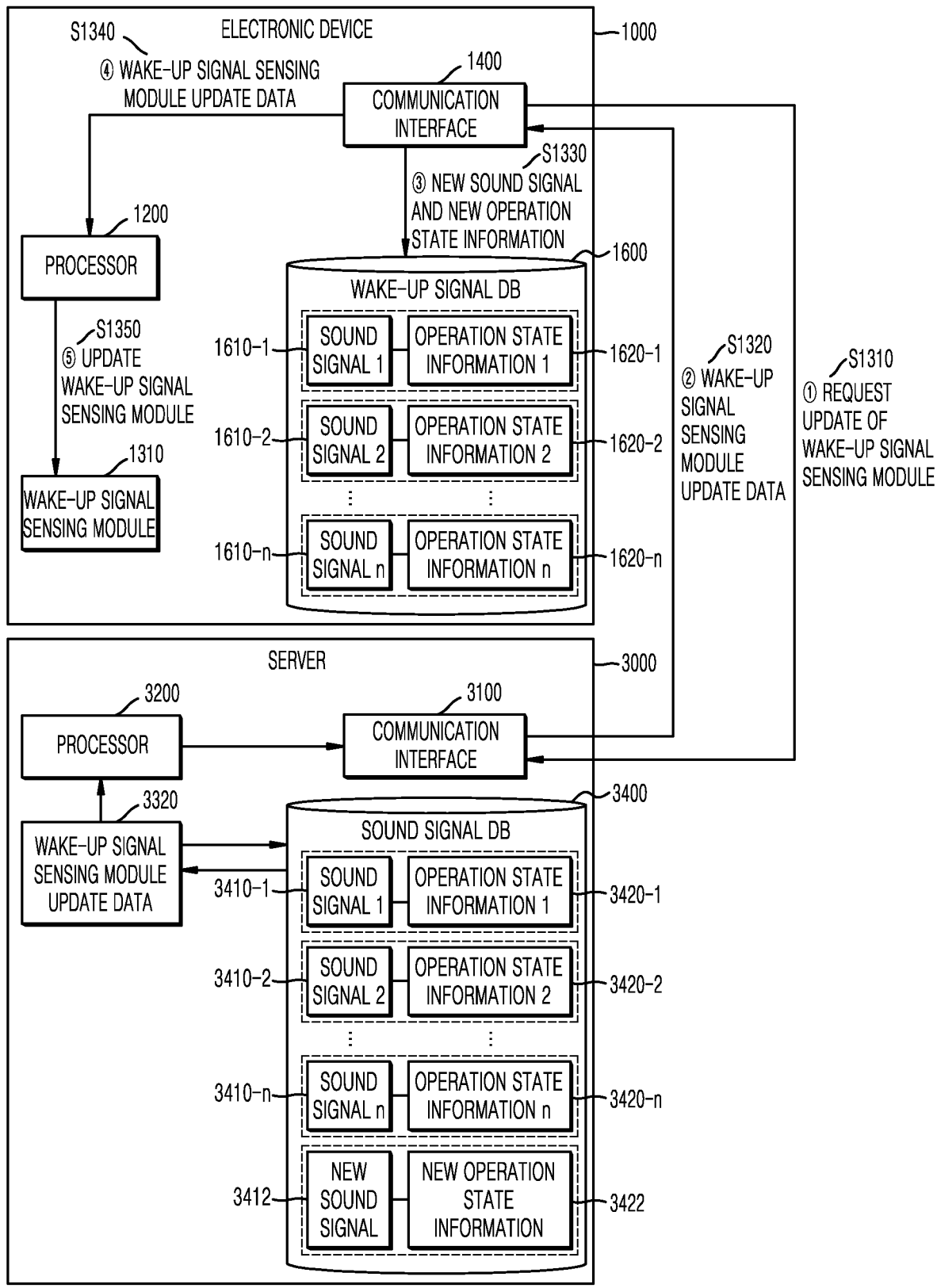
FIG. 13 illustrates an embodiment of an electronic device updating a wake-up signal sensing module by using data received from a server, according to an embodiment of the disclosure.

FIG. 13 illustrates an embodiment of the electronic device 1000 updating the wake-up signal sensing module 1310 by using update data received from the server 3000, according to an embodiment of the disclosure.

Referring to FIG. 13, the electronic device 1000 may include the processor 1200, the wake-up signal sensing module 1310, the communication interface 1400, and the wake-up signal database 1600, and the server 3000 may include a communication interface 3100, a processor 3200, wake-up signal sensing module update data 3320, and the sound signal database 3400. In the electronic device 1000 and the server 3000 illustrated in FIG. 13, essential components for describing a function and/or operation for updating the wake-up signal sensing module 1310 of the electronic device 1000 are illustrated. However, components included in the electronic device 1000 and the server 3000 are not limited to those illustrated in FIG. 13.

The wake-up signal database 1600 may store the plurality of sound signals 1610-1 to 1610-n and the plurality of pieces of operation state information 1620-1 to 1620-n. The plurality of sound signals 1610-1 to 1610-n and the plurality of pieces of operation state information 1620-1 to 1620-n, stored in the wake-up signal database 1600, may be obtained from a user input received from a user through a registration procedure and stored.

The server 3000 may include the sound signal database 3400 storing the plurality of sound signals 3410-1 to 3410-n (3412) and the plurality of pieces of operation state information 3420-1 to 3420-n (3422). According to an embodiment of the disclosure, a first sound signal 3410-1 to a n-th sound signal 3410-n, stored in the sound signal database 3400, may be the same as a first sound signal 1610-1 to a n-th sound signal 1610-n, stored in the wake-up signal database 1600 of the electronic device 1000. According to an embodiment of the disclosure, first operation state information 3420-1 to n-th operation state information 3420-n, stored in the sound signal database 3400, may be the same as first operation state information 1620-1 to n-th operation state information 1620-n, stored in the wake-up signal database 1600 of the electronic device 1000.

The server 3000 may further store a sound signal of a new household electrical device and operation state information related to the sound signal. Herein, the 'new household electrical device' may be a household electrical device newly purchased or obtained by a user of the electronic device 1000 and then registered in the server 3000 through the electronic device 1000.

The electronic device 1000 may perform a registration procedure of logging in with a user account and then registering device identification information (for example, a device id, a device serial number, etc.) of the new household electrical device in a user account of the server 3000. The new household electrical device may include a speaker without network function and outputs a sound signal representing an operation state.

The server 3000 may store a sound signal output from the new household electrical device and operation state information represented by the sound signal, through the registration procedure. In the embodiment illustrated in FIG. 13, the sound signal database 3400 of the server 3000 may store a new sound signal 3412 output from the new household electrical device, and new operation state information 3422 of the new household electrical device, indicated by the new sound signal 3412. The new operation state information 3422 stored in the sound signal database 3400 may further include device information about the new household electrical device that outputs the new sound signal 3412. For example, the new operation state information 3422 may include device identification information (for example, device id) or information about a device type of the new household electrical device. A new sound signal output from the new household electrical device and new operation state information indicated by the new sound signal may have not been stored in the wake-up signal database 1600 of the electronic device 1000 by a user.

The server 3000 may store the wake-up signal sensing module update data 3320 for updating the wake-up signal sensing module 1310 of the electronic device 1000 in the memory 1330. The wake-up signal sensing module update data 3320 may be data for updating the wake-up signal sensing module 1310 to the latest version such that the wake-up signal sensing module 1310 of the electronic device 1000 detects the new sound signal 3412 output from the new household electrical device to identify the new operation state information 3422 which is operation state information of the new household electrical device, indicated by the new sound signal 3412.

When a user purchases a new household electrical device or registers a new household electrical device in the server 3000 through the electronic device 1000, a sound signal output from the new household electrical device may have not been stored in the wake-up signal database 1600 of the electronic device 1000. In this case, although a sound signal is output from the new household electrical device, the wake-up signal sensing module 1310 of the electronic device 1000 may fail to detect the output sound signal as a wake-up signal, and accordingly, the electronic device 1000 may fail to identify operation state information of the new household electrical device.

In operation S1310, the processor 1200 of the electronic device 1000 may transmit an update request signal for requesting an update of the wake-up signal sensing module 1310 to the server 3000 through the communication interface 1400. According to an embodiment of the disclosure, the electronic device 1000 may receive a user input requesting an update of firmware or software constructing the wake-up signal sensing module 1310, and transmit an update request query to the server 3000 according to the reception of the user input, but is not limited thereto. According to another embodiment of the disclosure, the processor 1200 may transmit a query requesting an update of the wake-up signal sensing module 1310 to the server 3000 every preset time period (for example, one hour, one day, one week, one month, etc.).

When the electronic device 1000 transmits an update request signal to the server 3000, the electronic device 1000 may transmit version information of the wake-up signal sensing module 1310, together with the update request signal, to the server 3000.

In operation S1320, the server 3000 may transmit the wake-up signal sensing module update data 3320 to the electronic device 1000 through the communication interface

3100, in response to the update request signal received from the electronic device 1000. According to an embodiment of the disclosure, the processor 3200 of the server 3000 may check version information of the wake-up signal sensing module 1310, received from the electronic device 1000, and compare the version information of the wake-up signal sensing module 1310 with version information of the wake-up signal sensing module update data 3320. When the wake-up signal sensing module 1310 is not the latest version according to a result of the comparing, the processor 3200 may control the communication interface 3100 to transmit the wake-up signal sensing module update data 3320 to the electronic device 1000.

The wake-up signal sensing module update data 3320 may include the latest version of firmware or software for detecting the new sound signal 3412 to identify the new operation state information 3422. According to an embodiment of the disclosure, the wake-up signal sensing module update data 3320 may access the sound signal database 3400 to obtain the new sound signal 3412 and the new operation state information 3422, but is not limited thereto. However, the wake-up signal sensing module update data 3320 may include the new sound signal 3412 and the new operation state information 3422.

In operations S1310 and S1320, the communication interface 1400 of the electronic device 1000 and the communication interface 3100 of the server 3000 may transmit/receive data through a wired or wireless communication network. The electronic device 1000 and the server 3000 may transmit and receive a query signal or update data by using at least one data communication network of, for example, wired LAN, wireless LAN, Wi-Fi, Bluetooth, zigbee, WFD, BLE, Wibro, WiMAX, SWAP, WiGig, or RF communication.

In operation 51330, the electronic device 1000 may obtain the new sound signal 3412 and the new operation state information 3422 from the wake-up signal sensing module update data 3320 received from the server 3000, and store the obtained new sound signal 3412 and the obtained new operation state information 3422 in the wake-up signal database 1600. According to an embodiment of the disclosure, the electronic device 1000 may store, in addition to the new sound signal 3412 and the new operation state information 3422, device information of the new household electrical device, for example, device identification information and device type information of the new household electrical device in the wake-up signal database 1600.

In operation 51340, the processor 1200 of the electronic device 1000 may receive the wake-up signal sensing module update data 3320 through the communication interface 1400.

In operation 51350, the processor 1200 of the electronic device 1000 may update the wake-up signal sensing module 1310 by using the wake-up signal sensing module update data 3320.

In the embodiment illustrated in FIG. 13, the electronic device 1000 may update the wake-up signal sensing module 1310 to the latest version by using the wake-up signal sensing module update data 3320 received from the server 3000. By updating the wake-up signal sensing module 1310, the electronic device 1000 may sense the new sound signal 3412 output from the new household electrical device as a wake-up signal, and identify the new operation state information 3422 indicated by the new sound signal 3412. The user who has purchased a new household electrical device without network function may detect operation state information of the new household electrical device according to a sound signal from the new household electrical device through the electronic device 1000, without paying additional cost. Accordingly, the embodiment of the disclosure may improve user convenience and satisfaction without any financial burden.

Figure 14:
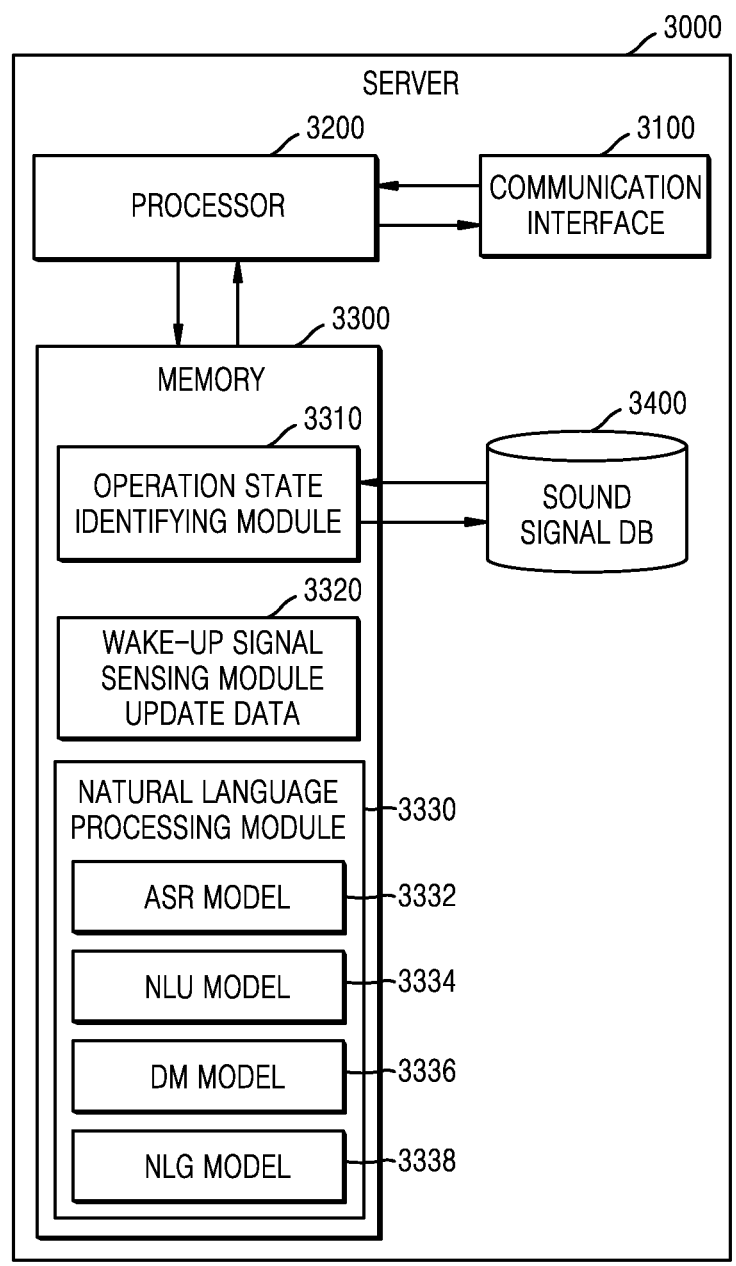
FIG. 14 illustrates a block diagram of components of a server according to an embodiment of the disclosure.

FIG. 14 illustrates a block diagram of components of a server according to an embodiment of the disclosure.

The server 3000 may receive a sound signal from the electronic device 1000, identify operation state information corresponding to the received sound signal, and transmit the identified operation state information to the electronic device 1000, but is not limited thereto. However, the server 3000 may receive a voice signal generated by a user's utterance from the electronic device 1000, interpret the received voice signal by using a natural language processing module 3330, and transmit a response message according to a result of the interpretation on the voice signal to the electronic device 1000.

Referring to FIG. 14, the server 3000 may include the communication interface 3100, the processor 3200, the memory 3300, and the sound signal database 3400.

The communication interface 3100 may be configured to perform data transmission/reception to/from the electronic device 1000 or the mobile terminal 4000 through a wired or wireless communication network. The communication interface 3100 may perform data communication with the electronic device 1000 or the mobile terminal 4000 by using at least one data communication network of, for example, a wired LAN, a wireless LAN, Wi-Fi, Bluetooth, zigbee, WFD, BLE, Wibro, WiMAX, SWAP, WiGig, or RF communication.

According to an embodiment of the disclosure, the communication interface 3100 may receive at least one of a sound signal or a voice signal from the electronic device 1000, through a control by the processor 3200. The sound signal may be a signal output from the household electrical device 2000, and the voice signal may be a signal converted from a voice input uttered by a user.

According to an embodiment of the disclosure, the communication interface 3100 may transmit operation state information to the electronic device 1000 or the mobile terminal 4000 through a control by the processor 3200.

The processor 3200 may execute one or more instructions of a program stored in the memory 3300. The processor 3200 may be configured with a hardware component for performing arithmetic, logic, and input/output operations and signal processing. The processor 3200 may be configured as at least one of, for example, a CPU, a microprocessor, a GPU, ASICs, DSPs, DSPDs, PLDs, or FPGAs, but is not limited thereto.

According to an embodiment of the disclosure, the processor 3200 may be configured as a dedicated hardware chip for performing AI training.

The memory 3300 may store instructions and program codes that are readable by the processor 1200. In the following embodiments of the disclosure, the processor 3200 may be implemented by executing the instructions or program codes stored in the memory 3300.

The memory 3300 may be configured with at least one type of storage medium of, for example, a flash memory type, a hard disk type, a multimedia card micro type, card type memory (for example, SD or XD memory), RAM, SRAM, ROM, EEPROM, and PROM, or an optical disk.

The memory 3300 may store instructions or program codes for each of an operation state identifying module 3310, the wake-up signal sensing module update data 3320, and the natural language processing module 3330. A 'module' included in the memory 3300 means a unit for processing a function or operation that is performed by the processor 3200, and may be implemented with software, such as instructions or program codes.

The operation state identifying module 3310 may be a module configured to identify an operation state of the household electrical device 2000 by detecting a sound signal received from the electronic device 1000. According to an embodiment of the disclosure, the operation state identifying module 3310 may be configured to compare the sound signal with a plurality of sound signals stored in advance in the sound signal database 3400, and identify a sound signal corresponding to the received sound signal from among the plurality of sound signals according to a result of the comparing. The operation state identifying module 3310 may be configured to identify operation state information corresponding to the identified sound signal among a plurality of pieces of operation state information stored in the sound signal database 3400.

The processor 3200 may receive a sound signal or a voice signal from the electronic device 1000 through the communication interface 3100. The processor 3200 may compare the received sound signal with the plurality of sound signals stored in advance in the sound signal database 3400 by executing the instructions or program codes of the operation state identifying module 3310, thereby identifying a sound signal corresponding to the received sound signal from among the plurality of sound signals. According to an embodiment of the disclosure, the processor 3200 may measure similarities between the received sound signal and the plurality of sound signals stored in the sound signal database 3400, and identify a sound signal corresponding to the sound signal received from the electronic device 1000 from among the plurality of sound signals based on the similarities. A method of measuring similarities between sound signals and identifying the corresponding sound signal in the processor 3200 of the server 3000 may be the same as that performed by the processor 1200 of the electronic device 1000 illustrated in FIG. 3, and therefore, redundant descriptions will be omitted.

The processor 3200 may identify operation state information corresponding to the sound signal identified from the sound signal database 3400. The sound signal database 3400 may store a plurality of sound signals, and a plurality of pieces of operation state information respectively corresponding to the respective sound signals. According to an embodiment of the disclosure, the plurality of sound signals and the plurality of pieces of operation state information may be stored in key-value types in the sound signal database 3400. For example, the plurality of sound signals may be stored as keys in the sound signal database 3400, and the corresponding pieces of the plurality of pieces of operation state information may be stored as values in the wake-up signal database 1600. The processor 3200 may identify operation state information mapped to the identified sound signal in a key-value type from the sound signal database 3400.

The processor 3200 may extract the identified operation state information from the sound signal database 3400, and provide the extracted operation state information to the communication interface 3100. The processor 3200 may control the communication interface 3100 to transmit the extracted operation state information to the electronic device 1000.

According to an embodiment of the disclosure, the processor 3200 may generate a notification message representing the operation state information. The processor 3200 may generate a notification message representing the operation state information of the household electrical device 2000 by using a NLG model 3338. For example, when the processor 3200 identifies operation state information 'washing completion of the washing machine' from the sound signal database 3400, the processor 3200 may generate a notification message "Washing is completed by the washing machine" representing washing completion. As another example, when the processor 3200 identifies operation state information 'door opening of the refrigerator' from the sound signal database 3400, the processor 3200 may generate a notification message "The door of the refrigerator opened. Close the door of the refrigerator" having an intent of close the door of the refrigerator.

The notification message generated by the processor 3200 may be data in a form of text. The processor 3200 may control the communication interface 3100 to transmit text data including the notification message to the electronic device 1000 or the mobile terminal 4000 of the user.

The wake-up signal sensing module update data 3320 may be data for updating the wake-up signal sensing module 1310 (see FIG. 13) of the electronic device 1000. The wake-up signal sensing module update data 3320 may be data for updating the wake-up signal sensing module 1310 to the latest version such that the wake-up signal sensing module 1310 of the electronic device 1000 detects a new sound signal output from a new household electrical device to identify new operation state information which is operation state information of the new household electrical device, indicated by the new sound signal. The wake-up signal sensing module update data 3320 has been described above with reference to FIG. 13, and therefore, redundant descriptions will be omitted.

The natural language processing module 3330 may be a module configured to detect a voice signal received from the electronic device 1000 and provide a response message according to the detected voice signal. The 'voice signal' may be a signal converted from a voice input uttered by a user and received by the electronic device 1000. The voice signal may be received from the electronic device 1000. The natural language processing module 3330 may include an ASR model 3332, a NLU model 3334, a dialogue management (DM) model, and a NLG model 3338.

The ASR model 3332 may be a model configured to convert a voice signal into a form of text that is readable by the processor 3200. The processor 3200 may perform ASR by executing instructions or program codes of the ASR model 3332. The processor 3200 may perform ASR to convert a voice signal received from the electronic device 1000 into text.

The NLU model 3334 may be a model configured to interpret the text converted by the ASR model 3332 and detect an intent according to a result of the interpretation on the text. The 'intent' may be information representing an intention included in the user's utterance, and include a request, an inquiry, operation execution, etc. from the user. The processor 3200 may obtain intent information from the text by executing instructions or program codes constructing the NLU model 3334. For example, when the text is "Let me know today's weather", the processor 3200 may obtain intent information 'request for weather information'. According to an embodiment of the disclosure, the NLU model 3334 may obtain information about a domain or parameter of the text, in addition to the intent, by interpreting the text.

The NLU model 3334 may be configured as a rule-based model, but is not limited thereto. According to an embodiment of the disclosure, the NLU model 3334 may be configured as an AI model. The NLU model 3334 may be configured as at least one of, for example, convolutional neural network (CNN), recurrent neural network (RNN), support vector machine (SVM), linear regression, logistic regression, Naïve Bayes, random forest, decision tree, or k-nearest neighbor algorithm, or a combination thereof.

The DM model 3336 may be configured to receive at least one piece of data of a domain, an intent, or a parameter output from the NLU model 3334 and output a related response message. According to an embodiment of the disclosure, the DM model 3336 may provide a response or an answer message according to an intention of a user's voice input. The processor 3200 may obtain a response message with respect to a user's intent by executing instructions or program codes configuring the DM model 3336.

The NLG model 3338 may be a model configured to generate a response message received from the DM model 3336 in a form of a natural language. The processor 3200 may generate a response message in a form of a natural language by executing instructions or program codes configuring the NLU model 3334. For example, the processor 3200 may generate a response message such as "The volume of the TV is raised by one level".

The processor 3200 may transmit the generated response message to the electronic device 1000 through the communication interface 3100. According to an embodiment of the disclosure, the processor 3200 may transmit the response message to the user's mobile terminal through the communication interface 3100.

Figure 15:
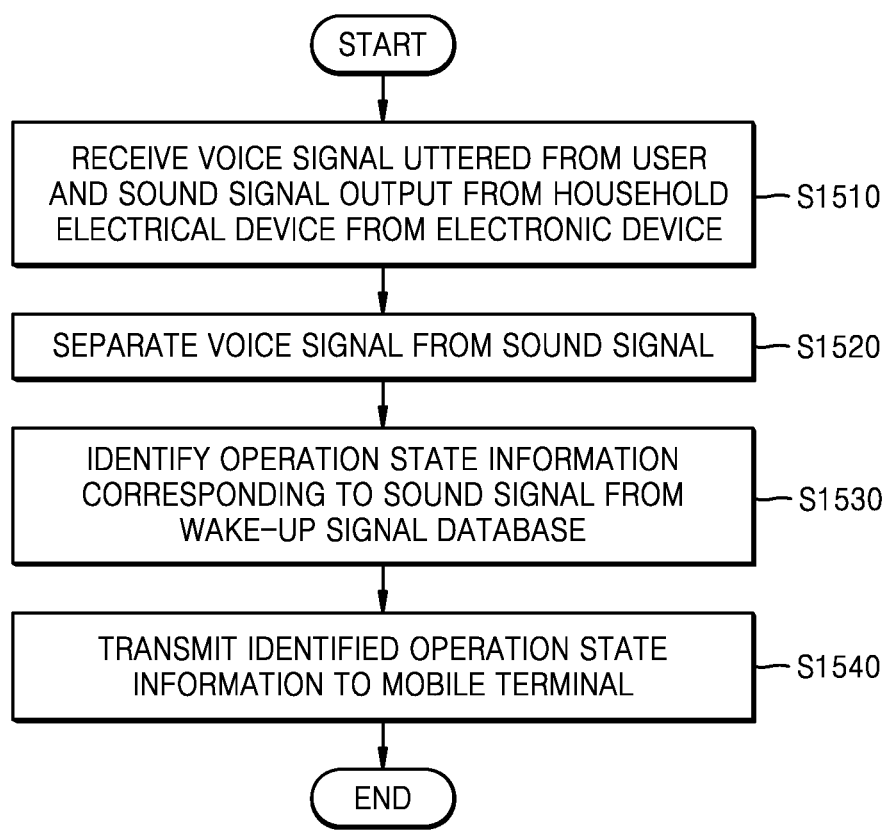
FIG. 15 illustrates a flowchart of a method of operating a server according to an embodiment of the disclosure.

FIG. 15 illustrates a flowchart of a method of operating the server 3000 according to an embodiment of the disclosure.

In operation S1510, the server 3000 may receive a voice signal uttered by a user and a sound signal output from the household electrical device 2000, from the electronic device 1000. The 'sound signal' may be a signal output from the household electrical device 2000, and the 'voice signal' may be a signal converted from a voice input uttered by the user.

In operation 51520, the server 3000 may separate the voice signal from the sound signal. According to an embodiment of the disclosure, the server 3000 may extract the voice signal by using a noise canceling function, and separate the sound signal from the voice signal.

In operation S1530, the server 3000 may identify operation state information corresponding to the sound signal from the sound signal database 3400 (see FIG. 14). According to an embodiment of the disclosure, the server 3000 may compare the sound signal received in operation S1510 with the plurality of sound signals 3410-1 to 3410-*n* (see FIG. 2B) stored in advance in the sound signal database 3400, and identify a sound signal corresponding to the sound signal received from the household electrical device 2000 from among the plurality of sound signals 3410-1 to 3410-*n* according to a result of the comparing. According to an embodiment of the disclosure, the server 3000 may measure similarities between the sound signal received from the electronic device 1000 in operation S1510 and the plurality of sound signals 3410-1 to 3410-*n* stored in advance in the sound signal database 3400, and identify a sound signal having a greatest similarity from among the plurality of sound signals 3410-1 to 3410-*n*.

The server 3000 may identify operation state information mapped to correspond to the identified sound signal from among the plurality of pieces of operation state information 3420-1 to 3420-*n* (see FIG. 2B) stored in advance in the sound signal database 3400.

In operation S1540, the server 3000 may transmit the identified operation state information to the mobile terminal 4000. According to an embodiment of the disclosure, the server 3000 may transmit the operation state information to the electronic device 1000, as well as the mobile terminal 4000.

In FIG. 15, the server 3000 is illustrated to transmit operation state information to the mobile terminal 4000, but is not limited thereto. According to an embodiment of the disclosure, the server 3000 may generate a notification message representing the operation state information identified in operation S1530 by using the NLG model 3338 (see FIG. 14). The server 3000 may transmit text data including the notification message to the mobile terminal 4000 of the user or the electronic device 1000.

The program that is executed by the electronic device 1000 described in the present specification may be implemented as a hardware component, a software component, and/or a combination of a hardware component and a software component. The program may be performed by all systems that can execute computer-readable instructions.

Software may include computer programs, codes, instructions, or one or more combinations thereof, for independently or collectively instructing or configuring a processing device to operate as desired.

The software may be implemented as a computer program including instructions stored in computer-readable storage media. Examples of the computer-readable storage media may be a magnetic storage medium (for example, ROM, RAM, a floppy disc, a hard disc, etc.), an optical readable medium (for example, compact disc-read only memory (CD-ROM), digital versatile disc (DVD)), etc. The computer-readable recording medium may be distributed to computer systems over a network, in which computer-readable codes may be stored and executed in a distributed manner. The medium may be readable by a computer, stored in a memory, and executed by a processor.

The computer-readable storage media may be provided in a form of non-transitory storage media. Herein, 'non-transitory' means that the storage media do not include a signal and current and are tangible, without meaning that data is semi-permanently or temporarily stored in the storage media. For example, the 'non-transitory storage media' may include a buffer in which data is temporarily stored.

Also, a program according to the embodiments disclosed in this specification may be included in a computer program product and provided. The computer program product may be traded as goods between a seller and a purchaser as a commodity.

The computer program product may include a software (S/W) program or a computer-readable storage medium storing an S/W program. For example, the computer program product may include an S/W program product (for example, a downloadable application) electronically distributed through a manufacturing company of an electronic device or an electronic market (for example, Google Play Store or App Store). For electronic distribution, at least one part of the software program may be stored in a storage medium or temporarily created. In this case, the storage medium may be a storage medium of a server of a manufacturing company of a vehicle or the electronic device 1000, a server of an electronic market, or a relay server that temporarily stores an S/W program.

The computer program product may include a storage medium of the server 3000 (see FIGS. 2B and 15) or a storage medium of the electronic device 1000 in a system configured with the electronic device 1000, the server 3000

(see FIGS. 2B and 15), and another electronic device (for example, the mobile terminal 4000 (see FIGS. 2A and 2B)). Alternatively, when there is a third device (for example, the mobile terminal 4000) communicatively connected to the electronic device 1000, the computer program product may include storage media of the third device. Alternatively, the computer program product may include an S/W program itself transmitted from the electronic device 1000 to another electronic device or the third device, or from the third device to the electronic device 1000.

In this case, one of the electronic device 1000, the other electronic device, and the third device may execute the computer program product to perform the method according to the embodiments of the disclosure. Alternatively, two or more of the electronic device 1000, the other electronic device, and the third device may execute the computer program product to distribute and perform the method according to the embodiments of the disclosure.

For example, the electronic device 1000 may execute a computer program product stored in the memory 1300 (see FIG. 3) to control another electronic device communicatively connected to the electronic device 1000 to perform the method according to the embodiments of the disclosure.

As another example, the third device may execute a computer program product to control an electronic device communicatively connected to the third device to perform the method according to the embodiments of the disclosure.

When the third device executes a computer program product, the third device may download the computer program product from the electronic device 1000 and execute the downloaded computer program product. Alternatively, the third device may execute a computer program product provided in a pre-loaded state to perform the method according to the embodiments of the disclosure.

Although the embodiments of the disclosure have been described above in connection with limited embodiments and drawings, it shall be understood that various changes and modifications can be made from the above description by those skilled in the art to which the disclosure pertains. For example, an appropriate result can be achieved even if the technologies described above are performed in different orders from the method described herein, and/or the described components such as the computer system, the module, etc. are coupled or combined in different forms from the method described herein, or replaced or substituted by other components or equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for providing information representing an operation state of a household electrical device, the electronic device comprising:
  a memory storing a plurality of sound signals output from at least one household electrical device as a plurality of wake-up signals, and storing a plurality of pieces of operation state information, respectively, representing a plurality of operation states of the at least one household electrical device, the plurality of operation states being related to the plurality of sound signals, respectively; and
  at least one processor operably coupled to the memory, the at least one processor configured to:
    receive, from among the plurality of sound signals through a microphone, a first sound signal from a first household electrical device,
    identify the first sound signal as a wake-up signal,
    identify first operation state information corresponding to the first sound signal based on the plurality of pieces of operation state information, and
    output, through an output interface, a notification message representing the first operation state information.

2. The electronic device of claim 1, wherein:
  the memory further stores at least one word uttered by a user as the wake-up signal; and
  the at least one processor is further configured to:
    receive, through the microphone, a voice input uttered by the user,
    detect a wake-up voice from the voice input by identifying the at least one word from the voice input, and
    in response to the wake-up voice being detected, perform a wake-up operation.

3. The electronic device of claim 2, wherein the at least one processor is further configured to:
  after performing the wake-up operation, transmit, through a communication interface, a second sound signal received from the first household electrical device to a server, and
  receive, through the communication interface, second operation state information of the first household electrical device corresponding to the second sound signal from the server.

4. The electronic device of claim 1, wherein the at least one processor is further configured to:
  calculate similarities between the first sound signal and the plurality of sound signals stored in the memory,
  determine, from among the plurality of sound signals, a sound signal having a greatest similarity as another sound signal corresponding to the first sound signal to identify the first operation state information, and
  identify, from among the plurality of pieces of operation state information, the first operation state information corresponding to the determined sound signal to identify the first operation state information.

5. The electronic device of claim 1, wherein the at least one processor is further configured to:
  transmit, to a mobile terminal of a user through a communication interface, the first operation state information, the mobile terminal being connected to the electronic device through a wireless communication network, and
  output, through the mobile terminal, the notification message representing the first operation state information.

6. The electronic device of claim 1, wherein:
  the memory further stores a plurality of pieces of follow-up operation information that is obtained in a connection with the plurality of pieces of operation state information; and
  the at least one processor is further configured to:
    identify first follow-up operation information related to the first operation state information, and
    output the first follow-up operation information.

7. The electronic device of claim 1, wherein the at least one processor is further configured to:
  receive a new sound signal from a new household electrical device newly registered in a server and new operation state information corresponding to the new sound signal from the server through a communication interface, and store device identification information of the new household electrical device, the new sound signal, and the new operation state information in the memory.

8. A method performed by an electronic device for providing information representing an operation state of a household electrical device, the method comprising:

receiving a first sound signal from a first household electrical device;

identifying the first sound signal as a wake-up signal;

identifying first operation state information corresponding to the first sound signal, based on a plurality of pieces of operation state information stored in memory;

outputting a notification message representing the first operation state information;

storing, in the memory, a plurality of sound signals output from at least one household electrical device as a plurality of wake-up signals; and storing a plurality of pieces of operation state information, respectively, representing a plurality of operation states of the at least one household electrical device, the plurality of operation states being related to the plurality of sound signals, respectively.

9. The method of claim 8, further comprising:

storing, in the memory, at least one word uttered by a user as the wake-up signal;

receiving a voice input uttered by the user;

detecting a wake-up voice from the voice input by identifying the at least one word from the voice input; and in response to the wake-up voice being detected, performing a wake-up operation.

10. The method of claim 9, further comprising:

after performing the wake-up operation, transmitting, to a server, a second sound signal received from the first household electrical device, and receiving second operation state information of the first household electrical device corresponding to the second sound signal from the server.

11. The method of claim 8, further comprising:

calculating similarities between the first sound signal and the plurality of sound signals stored in the memory;

determining, from among the plurality of sound signals, a sound signal having a greatest similarity as another sound signal corresponding to the first sound signal to identify the first operation state information; and identifying, from among the plurality of pieces of operation state information, the first operation state information corresponding to the determined sound signal to identify the first operation state information.

12. The method of claim 8, further comprising:

transmitting, to a mobile terminal of a user, the first operation state information, wherein the mobile terminal is connected to the electronic device through a wireless communication network; and outputting, through the mobile terminal, the notification message representing the first operation state information.

13. The method of claim 8, further comprising:

storing a plurality of pieces of follow-up operation information that is obtained in a connection with the plurality of pieces of operation state information;

identifying first follow-up operation information related to the first operation state information from the memory; and outputting the first follow-up operation information.

14. The method of claim 8, further comprising:

transmitting, to a server, a registration request including user account information and device identification information of a new household electrical device, wherein the registration request includes a request to register the new household electrical device in the server based on a connection of the device identification information of the new household electrical device and the user account information.

15. A computer-readable recording medium embodying a computer program, the computer program comprising computer readable program code that when executed by at least one processor of an electronic device causes the at least one processor to:

receive a first sound signal from a first household electrical device;

identify the first sound signal as a wake-up signal;

identify first operation state information corresponding to the first sound signal, based on a plurality of pieces of operation state information stored in memory; and output a notification message representing the first operation state information, wherein, the medium is configured to:

store a plurality of sound signals output from at least one household electrical device as a plurality of wake-up signals, and store a plurality of pieces of operation state information respectively representing a plurality of operation states of the at least one household electrical device, the plurality of operation states being related to the plurality of sound signals, respectively.

* * * * *